US008688973B2

(12) United States Patent
Kerschbaum et al.

(10) Patent No.: US 8,688,973 B2
(45) Date of Patent: Apr. 1, 2014

(54) SECURING COMMUNICATIONS SENT BY A FIRST USER TO A SECOND USER

(75) Inventors: Florian Kerschbaum, Karlsruhe (DE); Alessandro Sorniotti, Antibes (FR)

(73) Assignee: SAP AG, Walldorf (DE)

( * ) Notice: Subject to any disclaimer, the term of this patent is extended or adjusted under 35 U.S.C. 154(b) by 761 days.

(21) Appl. No.: 12/722,260

(22) Filed: Mar. 11, 2010

(65) Prior Publication Data
US 2010/0235627 A1  Sep. 16, 2010

(30) Foreign Application Priority Data

Mar. 13, 2009 (EP) .................... 09290182

(51) Int. Cl.
*G06F 21/00* (2013.01)
*G06F 21/44* (2013.01)

(52) U.S. Cl.
CPC .................. *G06F 21/445* (2013.01)
USPC ......................... 713/155; 380/282

(58) Field of Classification Search
CPC .................................................. G06F 21/445
USPC ................... 380/277–286; 713/155–159
See application file for complete search history.

(56) References Cited

U.S. PATENT DOCUMENTS

| | | | | |
|---|---|---|---|---|
| 5,841,865 A * | 11/1998 | Sudia | ............................. | 380/286 |
| 2005/0060546 A1 * | 3/2005 | Parry et al. | ..................... | 713/171 |
| 2005/0102244 A1 * | 5/2005 | Dickinson et al. | ............. | 705/74 |
| 2006/0129825 A1 * | 6/2006 | Salomon et al. | .............. | 713/176 |
| 2006/0136717 A1 * | 6/2006 | Buer et al. | ..................... | 713/155 |
| 2007/0014400 A1 * | 1/2007 | Wack et al. | ..................... | 380/44 |
| 2007/0106897 A1 * | 5/2007 | Kulakowski | ................... | 713/171 |
| 2008/0170695 A1 * | 7/2008 | Adler et al. | .................... | 380/277 |
| 2008/0229103 A1 * | 9/2008 | Mutka et al. | ................... | 713/168 |
| 2008/0290994 A1 * | 11/2008 | Bruns et al. | ................... | 340/10.1 |
| 2010/0161969 A1 * | 6/2010 | Grebovich et al. | ........... | 713/156 |

OTHER PUBLICATIONS

Juels, Ari et al., "Unidirectional key distribution across time and space with applications to RFID security", Proceedings of the 17th conference on Security symposium, 2008, pp. 75-90. 16 pages.*
Extended European Search Report for EP Application No. 09290182. 6, mailed May 25, 2010, 9 pages.
Ateniese, G., "Untraceable RFID Tags via Insubvertible Encryption", Proceedings of the 12th ACM Conference on Computer and Communications Security, Nov. 7, 2005, pp. 92-101.
Saito, J., et al, "Enhancing privacy of Universal Re-encryption Scheme for RFID Tags", LNCS 3207, Embedded and Ubiquitous Computing, Jul. 30, 2004, pp. 879-890.

(Continued)

*Primary Examiner* — Catherine Thiaw
*Assistant Examiner* — Don Zhao
(74) *Attorney, Agent, or Firm* — Brake Hughes Bellermann LLP

(57) ABSTRACT

A computer-implemented method of securing communications sent by a first user to a second user may include receiving, by a first user from a trusted third party, at least one public cryptographic value corresponding to the first user and at least one private cryptographic value corresponding to the first user, providing, by the first user to a second user, a plurality of values corresponding to an identification device identified by an identifier, deriving, by the first user, a shared key, using the at least one private cryptographic value of the first user, and at least one of the plurality of values corresponding to the identification device identified by the identifier and protecting communications sent by the first user to the second user with the shared key.

19 Claims, 7 Drawing Sheets

(56) References Cited

OTHER PUBLICATIONS

Liang, Y., et al, "RFID System Security Using Identity-Based Cryptography", UIC 2008, LNCS 5061, Jun. 23, 2008, pp. 482-489.
Asif, Zaheeruddin et al., "Integrating the supply chain with RFID: A technical and Business Analysis.", Communications of the Association for Information Systems, vol. 15, Article 24, Mar. 2005, pp. 1-57.
Ateniese, Giuseppe et al., "Secret Handshakes with Dynamic and Fuzzy Matching", 2007, pp. 1-19.
Ateniese, Giuseppe et al., "Improved Proxy Re-Encryption Schemes with Applications to Secure Distributed Storage", ACM Transactions on Information and System Security, vol. 9 , Issue 1, Feb. 2006, 25 pages.
Ateniese, Giuseppe et al., "Proxy Re-Signatures: New Definitions, Algorithms, and Applications", Proceedings of the 12th ACM conference on Computer and communications security, Nov. 28, 2005, pp. 1-23.
Balfanz, Dirk et al., "Secret Handshakes from Pairing-Based Key Agreements", IEEE Symposium on Security and Privacy, 2003, pp. 1-17.
Bellare, Mihir et al., "Random Oracles are Practical: A Paradigm for Designing Efficient Protocols", Proceedings of the 1st ACM conference on Computer and communications security, Nov. 1993, pp. 1-21.
Bendavid, Ygal et al., "Proof of Concept of RFID-Enabled Supply Chain in a B2B e-Commerce Environment", Proceedings of the 8th International Conference on Electronic Commerce, Aug. 14, 2006, pp. 564-568.
Blaze, Matt et al., "Divertible Protocols and Atomic Proxy Cryptography", EUROCRYPT: Advances in Cryptology, International Conference on the theory and Application of Cryptographic Techniques, vol. 1403, May 28, 1998, pp. 1-18.
Boneh, Dan et al., "Efficient Selective-ID Secure Identity Based Encryption Without Random Oracles", In proceedings of Eurocrypt 2004, LNCS 3027, Sep. 2004, pp. 1-20.
Boneh, Dan et al., "Identity-Based Encryption from the Weil Pairing", SIAM Journal on Computing. vol. 32, No. 3, 2003, pp. 1-31.
Boneh, Dan et al., "Short Signatures from the Weil Pairing", Proceedings of the 7th International Conference on the Theory and Application of Cryptology and Information Security: Advances in Cryptology, 2001, pp. 516-534.
Canetti, Ran et al., "Chosen-Ciphertext Secure Proxy Re-Encryption", ACM Conference on Computer and Communications Security, Oct. 23, 2007, 22 pages.
Chabanne, Nerve et al., "Public Traceability in Traitor Tracing Schemes", Advances in Cryptology: Proceedings of Eurocrypt, LNCS 3494, May 22-26, 2005, pp. 1-16.
Diffie, Whitfield et al., "New Directions in Cryptography", IEEE Transactions on Information Theory, 22(6), Nov. 1976, pp. 1-12.
Garfinkel, Simson L., et al., "RFID Privacy: An overview of problems and proposed solutions", IEEE Security & Privacy, vol. 3 Issue:3, May-Jun. 2005, pp. 1-10.
Green, Matthew et al., "Identity-Based Proxy Re-Encryption", Conference on Applied Cryptography and Network Security, 2007, pp. 1-21.
Juels, Ari, "RFID Security and Privacy: A Research Survey", IEEE Journal on Selected Areas in Communication, vol. 24, No. 2. Sep. 28, 2005, pp. 1-19.
Juels, Ari et al., "Unidirectional key distribution across time and space with applications to RFID security", Proceedings of the 17th conference on Security symposium, 2008, pp. 75-90.
Juels, Ari et al., "Defining strong privacy for RFID", Fifth Annual IEEE International Conference on Pervasive Computing and Communications Workshops, Apr. 7, 2006, pp. 1-20.
Lal, Sunder et al., "Multi-PKG ID based signcryption", Cryptology ePrint Archive, Report 2008/050, pp. 1-7.
Lee, H. et al., "Privacy Threats and Issues in Mobile RFID", Proceedings of the First International Conference on Availability, Reliability and Security, IEEE, 2006, 5 pages.
Libert, Benoit et al., "Multi-use Unidirectional Proxy Re-Signatures", Proceedings of the 15th ACM conference on Computer and communications security, Oct. 27-31, 2008, pp. 511-520.
Santos, Brian L et al., "RFID in the supply chain: Panacea or Pandora's box?", Contributed Articles, Communications of the ACM, vol. 51, No. 10, Oct. 2008, pp. 127-131.
Shamir, Adi, "Identity-Based Cryptosystems and Signature Schemes", CRYPTO 1984, pp. 47-53.
Wamba, S.F. et al., "Enhancing Information Flow in a Retail Supply Chain Using RFID and the EPC Network: A Proof-of-Concept Approach", Journal of Theoretical and Applied Electronic Commerce Research, Jan. 2008, pp. 92-105.
Waters, Brent "Efficient Identity-Based Encryption Without Random Oracles", Advances in Cryptology—EUROCRYPT, Proceedings of the 24th Annual International Conference on the Theory and Applications of Cryptographic Techniques, 2005, pp. 1-13.
Yousuf, Yawer et al., "A survey of RFID Authentication Protocols", 22nd International Conference on Advanced Information Networking and Applications—Workshops, 2008, pp. 1346-1350.
Kerschbaum, F. et al., "RFID-Based Supply Chain Partner Authentication and Key Agreement", Proceedings of the second ACM conference on Wireless network security, Mar. 16-18, 2009, 10 pages.
Joux, A. "A One Round Protocol for Tripartite Diffie-Hellmann", Journal of Cryptology, vol. 17, No. 4, Jun. 23, 2004, pp. 263-276.
Decision to Grant for European Application No. 09290182.6, mailed May 10, 2012, 2 pages.
Response to European Search Report for EP Application No. 09290182.6, filed Nov. 11, 2010, 23 pages.

\* cited by examiner

SECURING COMMUNICATIONS SENT BY A FIRST USER TO A SECOND USER

CROSS-REFERENCE TO RELATED APPLICATION

This application claims priority under 35 U.S.C. §119 to European Patent Application EP09290182.6, filed Mar. 13, 2009, titled "SECURING COMMUNICATIONS SENT BY A FIRST USER TO A SECOND USER," which is incorporated herein by reference in its entirety.

TECHNICAL FIELD

This description relates to the use of cryptography to secure communications from a first user to a second user.

BACKGROUND

An identification device that supports tracking and tracing of items can be useful. Each item can be equipped with an identification device that carries an identifier, also referred to as a serial number. The identification device can be implemented as a Radio Frequency Identification (RFID) tag and can be read via radio frequency communication. Multiple identification devices can be read at once.

Types of RFID tags may include active and passive RFID tags. Active RFID tags have their own power supply while passive tags solely operate on the power of the signal emitted by a reader. The reader is a special device that can interoperate with the tags and read the identifiers stored in their memory. More complex and powerful tags can store information in memory and even perform simple cryptographic operations such as hashing.

SUMMARY

According to one aspect, a computer-implemented method of securing communications sent by a first user to a second user is provided. The method may comprise the following receiving, by the first user from a trusted third party, at least one public cryptographic value corresponding to the first user and at least one private cryptographic value corresponding to the first user, providing, by the first user to the second user, a plurality of values corresponding to an identification device identified by an identifier, deriving, by the first user, a shared key using the at least one private cryptographic value of the first user and at least one of the plurality of values stored on the identification device identified by the identifier and protecting communications sent by the first user to the second user with the shared key.

The shared key derived by the first user is equal to a shared key of the second user. Accordingly, both users may have accessed the identification device identified by the identifier, wherein the identification device may be a Radio Frequency Identification Tag.

The second user may receive, from the trusted third party, at least one public cryptographic value and at least one private cryptographic value. Furthermore, the second user may derive the shared key from the at least one private cryptographic value of the second user and at least one of the plurality of values stored on the identification device identified by the identifier.

It may be that providing the plurality of values comprises providing a second value which is a function of the at least one private cryptographic value of the second user.

Furthermore, the stored second value may be a power of a generator.

Providing the plurality of values may comprise providing a first value which is a function of a cryptographic identifier of the identification device. In addition, the cryptographic identifier may be a power of a generator.

Providing the plurality of values may comprise storing, by the first user, the plurality of values on the identification device identified by the identifier.

Providing the plurality of values may comprise transmitting, by the first user to the second user, the plurality of values corresponding to the identification device identified by the identifier. Transmitting the plurality of values may be understood as an alternative to storing the values on the identification device identified by the identifier. Furthermore, a set of values corresponding to multiple identification devices may be transmitted.

It may be the case that the stored plurality of values is updated by replacing at least one value of the stored plurality of values with a re-encrypted value.

Furthermore, the method may include receiving, by the first user from the trusted third party, a value which is a function of a secret cryptographic value of the second user, computing a value which is a function of a private cryptographic value of the second user using the value that is a function of the secret cryptographic value of the second user, updating the stored plurality of values by replacing the second value of the stored plurality of values with the computed value and storing the updated plurality of values on the identification device identified by the identifier.

Moreover, the method may include sending, by the first user, the second value of the stored plurality of values to the trusted third party and receiving, by the first user from the trusted third party, the re-encrypted value, where the re-encrypted value is derived from the second value of the stored plurality of values.

The re-encryption operation on the second value of the stored plurality of values may be performed by the trusted third party. In addition, the second value of the stored plurality of values and the re-encrypted second value may each be a power of a generator.

It may be the case that providing the plurality of values comprises providing a first value which is a function of the at least one private cryptographic value received by the first user.

In addition, storing the plurality of values may include storing a third value which is a function of the identity of the first user. The method may further include receiving, by the first user from the trusted third party, a value which is a function of the identity of the second user, updating the stored plurality of values by replacing the third value with the value which is a function of the identity of the second user, receiving, by the second user, the identification device identified by the identifier, comparing, by the second user, the third value of the stored plurality of values with a function of the identity of the second user.

It may be the case that mutual authentication is performed in order to verify that the first user and the second user have accessed the identification device identified by the identifier.

Furthermore, deriving the shared key may comprise performing mutual authentication. Performing mutual authentication may comprise sending, by the first user to the second user, a random challenge, receiving, by the first user from the second user, a value which is a function of the random challenge and the at least one private cryptographic value of the second user. It may be the case that the received value is a power of a generator.

Performing mutual authentication may also comprise computing, by the second user, a value which is a function of the random challenge and the at least one private cryptographic value of the second user.

Performing mutual authentication may also comprise comparing, by the first user, a function of the second value of the stored plurality of values with a function of at least one public cryptographic value of the second user.

Performing mutual authentication may further comprise comparing, by the second user, a function of the second value of the stored plurality of values with a function of the at least one public cryptographic value of the first user.

In addition, performing mutual authentication may comprise comparing the shared key derived by the first user with the shared key of the second user.

The comparing operations above may be performed by providing values as inputs to an efficiently computable, non-degenerate, bilinear map for which the Computational Diffie-Hellman Problem cannot be computed efficiently.

According to yet another aspect, a computer program product is provided. The computer program product may comprise computer-readable instructions, which, when loaded and executed on a computer system, cause the computer system to perform operations according to the method of any one of the preceding claims.

According to still another aspect, a computer system that provides secure communications among a plurality of users is provided. The system may comprise an identification device such as, for example, a Radio Frequency Identification Tag, where the identification device is identified by an identifier, wherein the identification device comprises a memory. The system may include a first computer operable to process instructions to store a plurality of values on the identification device identified by the identifier, a second computer and a third computer operable to provide at least one public cryptographic value to the first computer and the second computer, provide at least one private cryptographic value to the first computer and the second computer. The first computer is operable to derive a shared key from the at least one public cryptographic value provided to the first computer, the at least one private cryptographic value provided to the first computer and at least one of the plurality of values stored on the identification device identified by the identifier. The second computer is operable to derive the shared key from the at least one public cryptographic value provided to the second computer, the at least one private cryptographic value provided to the second computer and at least one of another plurality of values stored on the identification device identified by the identifier.

It may be that the plurality of values used by the first computer (i.e. a first plurality of values) and the another plurality of values used by the second computer (i.e. a second plurality of values), as referred to in the most recently preceding aspect are linked by a common value. The common value may be a cryptographic identifier of the identification device identified by the identifier.

In addition, the computer system may be further operable to perform the variations of the method aspects described above.

The subject matter described in this specification can be implemented as a method or as a system, possibly in the form of one or more computer program products. The subject matter described in this specification can be implemented on a machine readable medium, where the medium is embodied in one or more information carriers, such as a CD-ROM, a DVD-ROM, a semiconductor memory, or a hard disk. Such computer program products may cause a data processing apparatus to perform one or more operations described in this specification.

In addition, the subject matter described in this specification can also be implemented as a system including a processor and a memory coupled to the processor. The memory may encode one or more programs that cause the processor to perform one or more of the methods described in this specification. Further the subject matter described in this specification can be implemented using various machines.

The subject matter described in this specification may be implemented as a recordable storage medium having recorded and stored thereon instructions that, when executed, perform the actions such as, for example, the actions described in one or more of the methods described in this specification.

Details of one or more implementations are set forth in the accompanying exemplary drawings and description below. Other features will be apparent from the description, the drawings, and from the claims.

DETAILED DESCRIPTION

Technical Terms and Definitions

Figure 1:
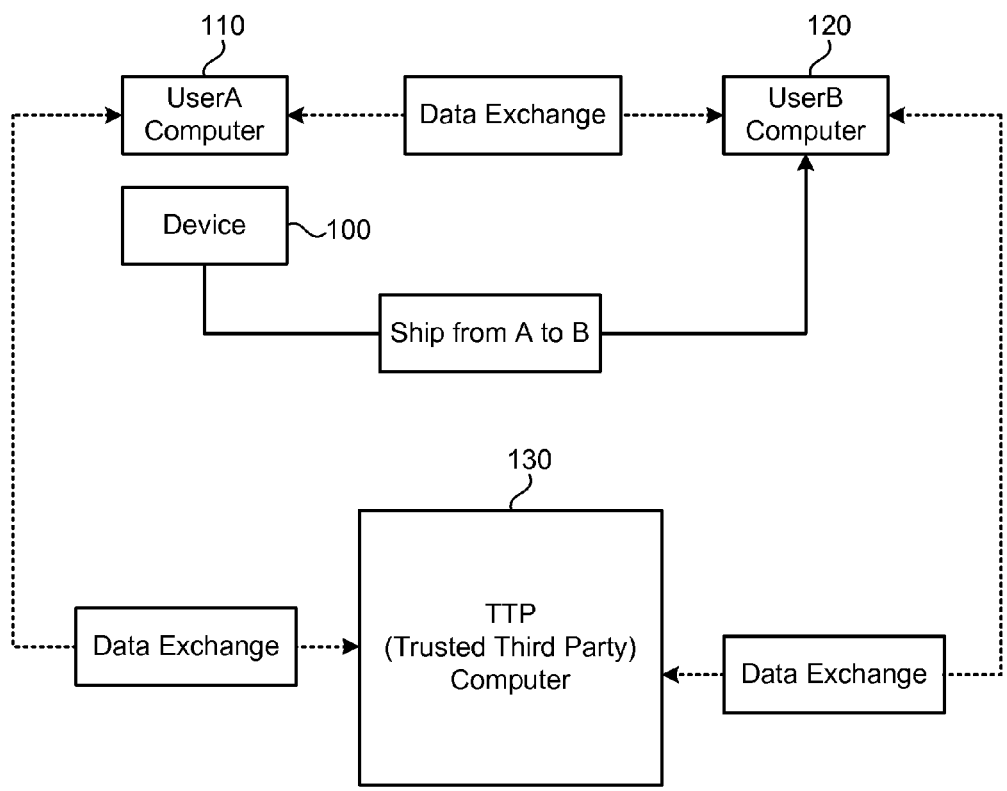
FIG. 1 shows an exemplary scenario where a first user, userA, ships an identification device to a second user, userB. The exchange(s) of data between the users and the trusted third party (TTP) are depicted with dotted lines. A solid line depicts the physical movement of an identification device from userA to userB.

The following technical terms are used throughout the description. The terms may refer to but are not limited to the following explanations.

Unless terms are specified otherwise, the following general definitions may be used.

Let $(G_1,*)$ and $(G_2,*)$ be two groups of order p for some large prime p. The bit size of p is determined by a security parameter. The bit-size of a number, e.g. p, may be understood as the number of bits needed to represent p. A number of factors may be relevant to the determination of a secure bit size including the nature of the communications being secured and the possible value of those communications to a third party. For example, communications regarding mozzarellas may not require the level of security advisable for communications regarding nuclear devices. Furthermore, it is possible that a bit-size which is secure for a particular application one year, may no longer be sufficient in a subsequent year. The progression of technology and advances in the study of cryptanalysis may effect the security of a cryptosystem and the appropriate bit-size.

According to one example, the bit-size of p is 1084 bits for a bilinear map based on supersingular elliptic curves and 640 bits for a bilinear map based on non-supersingular elliptic curves.

$Z^*_p = \{1, \ldots, p-1\}$, where $Z^*_p$ is a multiplicative group, where $a, b \in Z^*_p$, and $a, b$ are randomly chosen.

The order of a group, e.g. $G_1$, may be understood as the number of elements in the group.

g is a random generator of $G_1$. A generator may be referred to as a primitive root or a primitive element. A generator of a group of order p is a number whose powers generate all the nonzero elements of the group.

A group may be understood to be cyclic if the group has a generator.

A user may be understood to refer to a user computer or computing equipment operated by the user. Actions performed by a user may also include actions performed on behalf of the user or under the direction of the user. The terms "first", "second", and "third" are used to distinguish among a plurality of users. The terms userA, userB and userC (referring to a first user, a second user and a third user respectively) are used to facilitate understanding of terms in equations and figures. A user may refer to a natural person or a legal person.

Problems

The following cryptographic problems may be considered to be hard. A hard problem or a problem which cannot be efficiently computed may be understood as a problem for which there is no known probabilistic polynomial time (or more efficient) algorithm which may be used to compute a solution to the problem. A probabilistic algorithm may be understood as an algorithm using random-bit instructions. A probabilistic algorithm may be contrasted with a deterministic algorithm (one that does not use random-bit instructions).

Problem 1 The Computational Diffie-Hellman Problem (CDH) is hard if, for all probabilistic, polynomial-time algorithms B, $$AdvCDH_B := Pr[B(g, g^a, g^b) = g^{ab}]$$

is negligible in the security parameter. In other words, given the bit-size of p, there is a negligable probability that there exists a probabalistic polynomial time algorithm B that would provide an advantage in computing (i.e. allow the efficient computation of) $g^{ab}$ if $(g, g^a, g^b)$ are given.

Problem 2 The modified Computational Diffie-Hellman Problem (mCDH) is hard if, for all probabilistic, polynomial-time algorithms B, $$AdvmCDH_B := Pr[B(g, g^a, g^b, g^{b^{-1}}) = g^{ab}]$$

is negligible in the security parameter. In other words, given the bit-size of p, there is a negligible probability that there exists a probabalistic polynomial time algorithm B that would provide an advantage in computing (i.e. allow the efficient computation of) $g^{ab}$ if $(g, g^a, g^b, g^{b^{-1}})$ are given.

Problem 3 The Bilinear Decisional Diffie-Hellman Problem (BDDH) is hard if, for all probabilistic, polynomial-time algorithms B, $$AdvBDDH_B := Pr[B(g, g^a, g^b, g^c, g^x) = T \text{ if } x = abc] - \frac{1}{2}$$

is negligible in the security parameter. This probability is taken over a random choice of $g \in G_1$, a, b, c, $x \in Z^*_p$. In other words, gven the bit-size of p, there is a negligible probability that there exists a probabilistic polynomial time algorithm B that would provide an advantage in computing (i.e. allow the efficient computation of) whether x=abc if given the set of values $(g, g^a, g^b, g^c, g^x)$.

This concludes the list of cryptographic problems.

Bilinear map—A bilinear map (also referred to as a bilinear function) is a map $ê: G_1 \times G_1 \rightarrow G_2$, for which the Computational Diffie-Hellman Problem (CDH) problem cannot be efficiently computed. Furthermore, $G_1$ and $G_2$ may be understood to be cyclic groups.

A bilinear map satisfies the following three properties:
Bilinear: $g, h \in G_1$ and for a, $b \in Z^*_p$, $ê(g^a, h^b) = ê(g, h)^{ab}$
Non-degenerate: $ê(g, g) \cdot 1$ is a generator of $G_2$
Efficiently computable: there exists an algorithm to efficiently compute $ê(g, h)$ for all $g, h \in G_1$.

A bilinear map satisfying the three properties above may also be referred to as an admissible bilinear map. Examples of bilinear maps are modified Weil pairings on supersingular elliptic curves and modified Tate pairings on supersingular elliptic curves.

Cryptographic value—A cryptographic value may be understood as a value that can be used in a cryptographic operation. Cryptographic operations include deriving a shared key, encryption, decryption, re-encryption, authentication, and hashing.

A public cryptographic value and a private cryptographic value may be understood to be parts of an asymmetric cryptosystem, in which an encryption operation is performed using a key which is different from a key which is used to perform a decryption operation. For example, a public key is a public cryptographic value which can be used to encrypt a message and a private key is a private cryptographic value which can be used to decrypt a message.

A private cryptographic value may be known to the user to whom the value belongs and/or to a trusted third party. A secret cryptographic value, particularly in the context of an asymmetric cryptosystem, may be understood as a cryptographic value that is known only to a trusted third party.

Shared key—A shared key may be understood as a key used to perform symmetric cryptographic operations, e.g. symmetric encryption. A symmetric cryptosystem may be understood as a system where encryption and decryption operations are performed using the same key. Since encryption and decryption operations may be performed by different entities, the use of one key to perform both operations may be understood to indicate that the one key is a shared key.

Authentication—Authentication may be understood as a process of verification. In some cases, the verification may be performed with respect to the identity of a communication partner. In other cases, verification may be performed with respect to access, i.e. legitimate access, of an identification device identified by an identifier.

Cryptographic hash function—A cryptographic hash function, cryptographic hash, or hash may be understood as a function which maps a bit string of arbitrary finite length to a string of fixed length. The cryptographic hash function may be understood to be one-way and collision resistant. Examples of cryptographic hash functions are SHA-256 and SHA-512.

Re-encryption—Intuitively, re-encryption is the process of encrypting data under a new key without revealing a private or secret cryptographic value. A value may be re-encrypted under a public key or under a shared key. For example, given two independent encryption keys, e.g. $k_1$ and $k_2$, and data which is encrypted using $k_1$, re-encryption may be understood to be the process of encrypting the data using $k_2$.

Identification Device—An identification device may be understood to specify or identify an item or article. The item may be a pallet, a case or a product. The identification device may have at least 1 KB of memory. Intuitively, the identification device may be understood as a carrier of a cryptographic envelope, the contents of which may be processed off the device as part of a security protocol.

An example of an identification device is a Radio Frequency Identification (RFID) tag. The RFID tag may be active or passive. The RFID tag may be rewritable or write-once. If the RFID tag is not re-writable, the tag may be replaced before each write with a new RFID tag. The new RFID tag may have the same identifier. In the following description, it may be implied that the identification device is re-writable for ease of understanding. However, a write-once RFID tag that is replaced after each write may be used.

A type of RFID tag that can be used as an identification device may be a class 1, generation 2 RFID tag, as defined by the EPCglobal standard. A more powerful or advanced RFID tag may also be used.

Accessing an identification device may be understood to include reading information from the identification device. In the case of an RFID tag, access may include interacting with the RFID tag using an RFID tag reader.

Challenge-response protocol—A challenge-response protocol may be understood as an authentication protocol in which a first user sends a random number to a second user, who then performs a cryptographic transformation of the number and returns the transformed number, possibly with other data, to the first user.

Pseudo-random number generator—A pseudo-random number generator may be understood as being based on a deterministic algorithm which returns numbers that appear to be statistically random. A pseudo-random number generator may be implemented as an array of gates in hardware or as a computer program. References in the description to the selection or choice of a random element or a random value may be understood to refer to the computation of a random number using a pseudo-random number generator.

Identity based cryptosystem—An identity based cryptosystem may also be referred to as an identity based encryption system or an identity based cryptographic system. Identity based cryptography may be understood as a type of public key cryptography in which the public key of a user may be an arbitrary string. In some cases, the public key of the user is some unique information about the identity of the user, for example, the user's email address.

According to one example, a trusted third party may publish a master public key and retain a master private key. Given the master public key a user may compute a public key by combining the master public key with an identity value, for example, an email address of the user. To obtain a private key, the user may contact the trusted third party, who may use the master private key to generate a private key for the user.

An identity based cryptosystem may include an encryption operation to transform plaintext into ciphertext using a user's public key. The identity based cryptosystem may further include a get decryption key operation for a user to obtain a decryption key from the trusted third party. The user may obtain the decryption key using a challenge-response protocol. In addition, the identity based cryptosystem may include a decrypt operation to transform ciphertext into plaintext.

In the following text, a detailed description of examples will be given with reference to the drawings. It should be understood that various modifications to the examples may be made. Unless explicitly indicated otherwise, elements of one example may be combined and used in other examples to form new examples.

One possible use of an identification device is in supply chain management. In the supply chain each item can be tracked using the unique identifier of the identification device. An event happens when the identification device is read. At its most basic level this generates the following set of values:

<organization, identifier, timestamp>

This set of values is usually augmented with additional information, such as the identifier, type of event (e.g. receiving, shipping, unpacking, etc.), and additional fields depending on the type of event.

Companies are interested in communicating information linked to events for a number of reasons. One reason may be that a consumer is interested in knowing the steps that the product she purchased has gone through. Another reason may be that a company needs to recall flawed products and is interested in knowing the list of retailers that have sold the flawed products.

In order to share the data associated with events related to the use of an RFID tag, companies connect to a global network such as, for example, the global network currently being standardized by the EPCglobal consortium. This network contains a discovery service, which stores contact information for all companies that have event data for a specific tag. In order to retrieve all information about a tag, an interested party contacts the discovery service with a request. In response to the request, the discovery service returns the list of all companies to contact. Then the interested party may contact each company individually and retrieve event data.

One challenge with this system is that while companies have an incentive to share data associated with event information so as to facilitate their business operations, this information is highly confidential and (possibly competing) companies are reluctant to trust one another. Therefore, one concern is the possibility of espionage of a competitor's supply chain, carried out for instance by retrieving the event data about items in a competitor's supply chain.

In one possible situation, two companies, which might have never communicated before, contact each other with the help of the discovery service and need to mutually authenticate: the only thing they have ever had in common is that they have both accessed the same identification device at some point. These companies need to prove to each other that they have accessed the same identification device.

There are a number of attacks that might happen in this scenario:

1. An impostor might request information about an identification device he has never accessed, for example in order to track the supply chain of his competitor.

2. A malicious company might supply rogue information about identification devices he had never possessed, for instance so as to hide the origin of counterfeited products.

One simple way to secure communications between users who have both accessed the same identification device is to store a shared key on the identification device. The shared key could be used by everyone who accessed the identification device in order to secure subsequent communications. The communications might be secured using a symmetric encryption algorithm such as, for example, the Advanced Encryption Standard (AES). This simple solution might be suitable for business partners who trust each other but must communicate in an insecure environment.

It should be noted that while parts of the description refers to securing communications between users who have accessed an identification device, other scenarios are possible. For example, it would be possible for a first user to transmit values corresponding to an identification device to a second user. The transmitted values could take the place of the values read from an identification device.

However, using the simple solution, it is possible that someone who has accessed the item to divulge the shared key, since this action cannot be traced back to him. In addition, the identification device could be maliciously read by an outsider. Either of these cases could allow an attacker to fool a legitimate user into thinking that the attacker is another legitimate user who has accessed an identification device.

FIG. 1 shows a high level view of the interactions between two users (and/or user computers) and a trusted third party (TTP) computer 130 (which may be referred to as a trusted third party or TTP) in order to ship an identification device 100 from a first user, such as userA computer 110 (which may be referred to as userA), to a second user, such as userB computer 120 (which may be referred to as userB) or userC. The TTP 130 may be understood as an entity or organization which stores private and/or secret cryptographic values for its clients. The TTP 130 may also generate cryptographic values. The TTP 130 may further support users in updating information stored on the identification device 100 as the identification device 100 changes possession. While the following description refers to the TTP as a single entity, it should be understood that it is possible to divide the TTP into separate parties (e.g. for separate supply chains). It may also be possible to provide a plurality of TTPs by means of replication among the TTPs.

In the following description of FIG. 1, the users join a system of supply chain partners. However, other systems and/or organizations are possible. The process may be understood to include the following protocols.

Setup: The TTP 130 publishes system parameters and distributes the system parameters to each user, e.g. userA 110 and userB 120.

Register: A new user, e.g. userA 110, registers with the TTP 130 in order to join the supply chain. UserA 110 and the TTP 130 set up a plurality of public, private, and secret cryptographic values which are tied to the identity of userA 110. The TTP 130 distributes public and private cryptographic values to userA 110 and keeps the secret cryptographic values.

Initialize: UserA 110 would like to attach the identification device 100 to an item. UserA 110 stores a plurality of values on the identification device 100. The initialization of the identification device 100 may be performed without the intervention of the TTP 130.

Ship: UserA 110 contacts the TTP 130 in order to prepare to ship the identification device 100 to userB 120. The identification device 100 may be attached to an item. The TTP 130 may send a re-encryption key to userA 110. The re-encryption key can be used to create at least one new value to store on the identification device 100. As an alternative to the re-encryption key, the TTP 130 may compute and send a new set of values to store on the identification device 100.

Receive: UserB 120 receives the identification device 100 from userA 110. UserB may then read the plurality of values from the identification device 100 and store the values in a database. UserB 120 may be able to use the stored values to secure communications by creating or deriving a shared key, and performing mutual authentication with another user, e.g. userA 110, who has also accessed the identification device 100.

Secure communications: UserA 110 may derive a shared key based on at least one public cryptographic value, at least one private cryptographic value and at least one of the plurality of values stored on the identification device 100. UserB 120 may perform a similar operation. UserA 110 and userB 120 may also perform mutual authentication to verify that both have accessed the same identification device 100. Mutual authentication may include an exchange of random challenges to salt the protocol, where salt may be understood as a value added to ensure that the protocol cannot be repeated by a third party who observes the exchange. It may be the case that the users perform mutual authentication and later derive the shared key. Alternatively, it may be the case that mutual authentication is performed by comparing the derived shared key.

According to one specific example, the following scenario is possible. The production of a complex good needs the cooperation of different agents. This process often involves different companies that take part to the supply chain. For instance three different companies A, B and C may cooperate as follows: company A has an item and—according to its usual business—needs to ship it along to another company for further processing. The "next" company is not known in advance and company A chooses company B (but could easily have chosen company B'). A then performs the shipping operation invoking the ship algorithm. Similarly, B ships the item down to company C. Eventually the chain stops.

At a later point in time, company A and company C may need to interact on the basis of having accessed the identification device 100 coupled to an item, as described above. Notice that A and C have never interacted before, and may not have any pre-established business relationship whatsoever. Company A and company C have kept in a database the association of the identifier of the identification device DevID with the cryptographic values stored within the identification device 100 at the moment of its receipt. They use this information to perform a handshake that, if successful, allows them to safely rely on one another as business partners with respect to the identification device 100, and to share a key used to secure further communications.

An advantage may be that the values stored on the identification device 100 may be read by someone different from the intended recipient without jeopardizing the security of the system. This is because, assuming the difficulty of the cryptography problems defined above, it is not feasible to derive private or secret cryptographic values from the values stored on the identification device 100.

Figure 2:
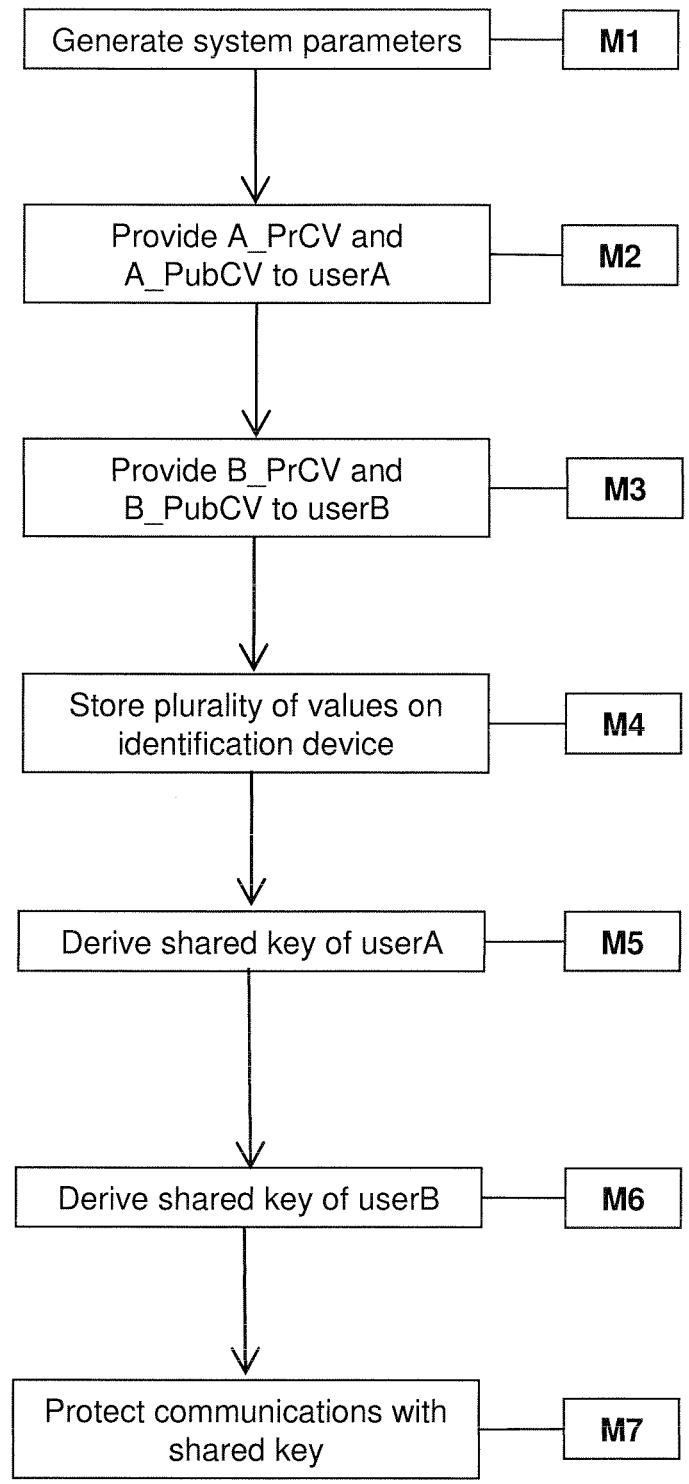
FIG. 2 shows an exemplary method of securing communications sent by a first user to a second user.

FIG. 2 shows how to secure communications between two users who have accessed the identification device 100. At M1, system parameters may be generated by a TTP 130. Communications or data exchanges between users and the TTP 130 may be authenticated and conducted over secure channels.

A user may register with the TTP 130, for example, in order to enter a supply chain partner network. At M2, the TTP 130 may provide a first user 110 (also referred to as userA) with at least one public cryptographic value A_PubCV and at least one private cryptographic value A_PrCV. Alternatively, the at least one public cryptographic value may be distributed prior to the distribution of at the least one private cryptographic value. At M3, the TTP 130 may provide a second user 120 (also referred to as userB or userC) with at least one public cryptographic value B_PubCV and least one private cryptographic value B_PrCV.

In order to initialize the identification device 100 at M4, userA 110 may store a plurality of values on the identification device 100. In an initialization step, one of the values may be a function of a cryptographic identifier of the identification device DevCID. However, step M4 may also be performed in preparation to ship the identification device 100, even though initialization may have been performed already by another user. The cryptographic identifier of the identification device DevCID may be different from the identifier or serial number of the identification device DevID. Initialization of the identification device 100 may be performed without the intervention of the TTP 130.

After initializing the identification device 100, userA 110 may then send or ship the identification device 100 to userB 120. Upon receipt of the device, the second user 120 may read the values stored on the device during M4 and store the values in a database; the values may be associated with the serial number of the identification device.

After two users have both had legitimate access to the device, the users may want to derive a shared key. It may be the case the users authenticate before deriving the shared key.

Alternatively, the users may derive a shared key and use a challenge-response protocol to prove knowledge of the shared key without compromising the key. At M5, userA 110 derives the shared key. The shared key may be derived using a public cryptographic value of the first user A_PubCV, a private cryptographic value of the first user A_PrCV and a value read from the identification device 100. Alternatively, the shared key may be derived using a public cryptographic value of the second user B_PubCV, a private cryptographic value of the first user A_PrCV and a value read from the identification device 100. Similarly, at M6, userB 120 may derive the shared key using either of the alternatives described above with respect to userA 110.

Such a derivation may have the following advantage. The shared key is derived based on a user's public cryptographic value and a user's private cryptographic value. In order to let a malicious user communicate securely, the first user (or the second) must provide the malicious user with his private cryptographic information or a shared key generated using his private cryptographic information. Unlike a shared key which is only linked to an authentication device, a shared key linked to cryptographic values of a user can be traced back to the user.

At M7, the shared key may be used to secure or protect communications performed by userA 110. Thus, the shared key may be used to protect communications between userA 110 and userB 120.

Figure 3:
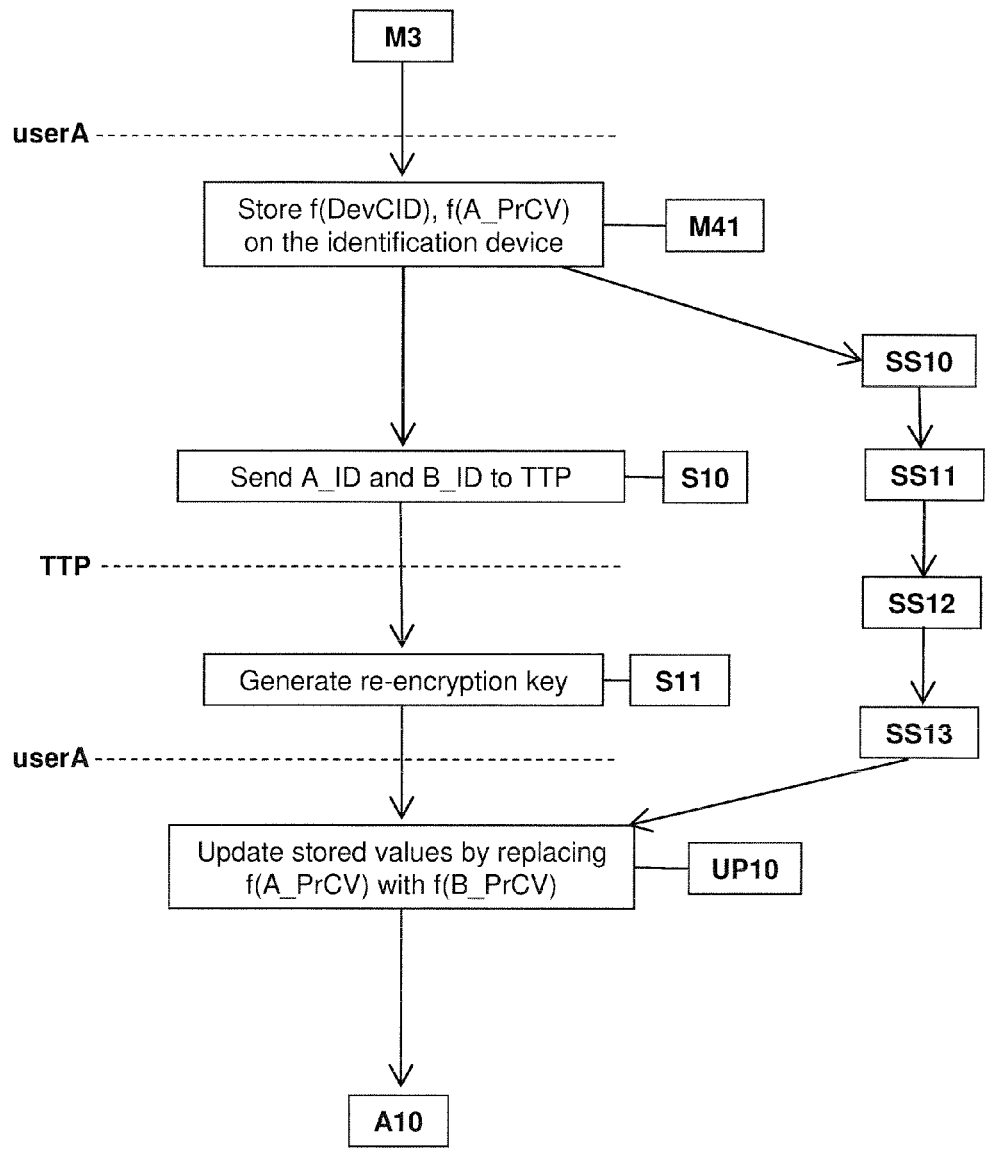
FIG. 3 shows an exemplary method of preparing an identification device to be shipped to another user. The relationship to FIG. 2 is shown via step M3, the relationship to FIG. 4 is shown via the steps SS10 to SS13, and the relationship to FIG. 6 is shown via step A10. Step M41 represents a possible implementation of step M4.

FIG. 3 shows an exemplary method of preparing the identification device 100 to be shipped to another user. Steps SS10, SS11, SS12, and SS13 refer to steps described in FIG. 4.

According to the exemplary method, the following system parameters may be generated by the TTP 130: $(p, G_1, G_2, g, \tilde{g}, \hat{e})$, where $g$ and $\tilde{g}$ are random generators of $G_1$. The system parameters may be published and may be known to all users. The TTP 130 may further select $$\alpha \xleftarrow{R} Z_p^*$$

and set $S=g^\alpha$. Thus, according to the example, the system's public parameters are $\{p, G_1, G_2, g, \tilde{g}, S, \hat{e}\}$; also, the value $\alpha$ is a secret cryptographic value known only to the TTP 130.

In order to register with the TTP 130, userA 110 may select two random elements $$y_A, z_A \xleftarrow{R} Z_p^*.$$

UserA 110 may then send $\tilde{g}^{y_A}$ and $g^{z_A}$ to the TTP 130. The TTP 130 may select a random element $x_A$ from $Z_p^*$. Selecting a random element from $Z_p^*$ may be understood as configuring a pseudo-random number generator to generate a number in the range of $\{1, \ldots, p-1\}$. The TTP 130 may send $(g^{x_A}\tilde{g}^{y_A})^{\alpha^{-1}}$ and $g^{x_A}$ to the first user, i.e. userA 110.

The network interactions involved in the registration protocol between userA 110 (A) and the TTP 130 (T) may be depicted as follows:

Diagram 1: Registration Protocol

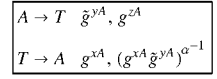

Continuing the example, the public cryptographic values of userA 110 A_PubCV may be denoted as the set of two values, $(g^{z_A}, (g^{x_A}\tilde{g}^{y_A})^{\alpha^{-1}})$. The public cryptographic values of userA A_PubCV may be distributed upon request by the TTP 130. The process of distributing these public cryptographic values may be similar to the process of distributing public keys by a Certification Authority. The private cryptographic values of userA A_PrCV, known to userA 110 and the TTP 130, may be denoted as the set of three values, $g^{x_A}, y_A, z_A$. The secret cryptographic value of userA 110, known only to the TTP 130, may be denoted as $x_A$. A similar registration process may be performed between userB 120 and the TTP 130 at M3.

At M41, userA 110 may initalize the identification device 100. M41 represents a particular implementation of step M4 from FIG. 1. In M41, a function of the cryptographic identifier of the device f(DevCID) and a function of at least one private cryptographic value provided to the first user f(A_PrCV) are stored on the device. More specifically, in an exemplary implementation, userA 110 may compute a random element $$t_{tag} \xleftarrow{R} Z_p^*,$$

e.g. using a pseudo-random number generator. UserA 110 may further compute $X_1=g^{t_{tag}}$ and $X_2=(g^{x_A})^{t_{tag}^{-1}}$. $X_1$ and $X_2$ are used to refer to the first and second values respectively, stored on the identification device. In this example, $X_1$ refers to f(DevCID) and $X_2$ refers to f(A_PrCV). $g^{x_A}$ may be understood as a private cryptographic value of userA A_PrCV, which may be used to perform re-encryption. UserA 110 may store the plurality of values $(X_1, X_2)$ on the identification device 100. UserA 110 may also store the plurality of values $(X_1, X_2)$ in a database for later use. UserA 110 may delete or wipe the value $t_{tag}$ for security reasons. Thus, $X_1$ may be understood as a function of the cryptographic identifier of the identification device, where $g^{t_{tag}}$ is the cryptographic identifier of the identification device. $X_2$ may be understood as a function of a private cryptographic value of userA, where the private cryptographic value of userA is $g^{x_A}$.

It should be understood that step M41 may have been performed by another user prior to the performance of steps S10 by userA 110 and S11 by the TTP 130.

UserA 110 may prepare to send or ship the identification device 100, possibly attached to an item, to userB 120. At S10, userA 110 may send an identifier of userA A_ID and an identifier of userB B_ID to the TTP 130. A user identifier may be a cryptographic hash of an email address or some other value associated with the user or the user's organization. Receiving A_ID and B_ID from userA 110 may indicate to the TTP 130 that userA 110 intends to send the identification device 100 to userB 120. The TTP 130 may generate a re-encryption key as a function of the secret cryptographic value of userB 120. According to a more specific example, the re-encryption key may be a function of the secret cryptographic value userB 120 and the inverse of the secret cryptographic value of userA, i.e. $k_{A,B} = x_A^{-1} x_B \mod p-1$. The TTP 130 may then send or transmit the re-encryption key, i.e. $k_{A,B}$, to userA 110. A protocol defining an interaction between userA 110 and the TTP 130 in preparation to ship the identification device 100 is depicted in Diagram 2.

Diagram 2: Ship Protocol

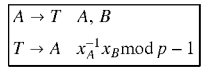

The ship protocol of Diagram 2 does not need to be performed for every identification device 100, but only once per shipping partner. In other words, userA 110 only needs to obtain a re-encryption key from the TTP 130 the first time userA 110 sends the identification device 100 to userB 120. UserA 110 may later reuse the re-encryption key provided for the first device to send further identification devices to userB 120. Enabling a user to reuse a re-encryption key may have the advantage of reducing the burden on the TTP 130 (i.e reducing the interaction between the users and the TTP 130).

UserA 110 may then use the re-encryption key transmitted by the TTP 130 to compute $X'_2 = X^{k_{A,B}}_2 = ((g^{x_A})^{t_{tag}^{-1}})^{x_A^{-1} x_B} = (g^{x_B})^{t_{tag}^{-1}}$. Computing $X'_2$ may be understood as using a value that is a function of the secret cryptographic value of the second user, i.e. the re-encryption key, to compute a value which is a function of a private cryptographic value of the second user, i.e. $X'_2$. At UP10, userA 110 may then update the plurality of values stored on the identification device 100 by replacing $X_2$ with $X'_2$. In other words, the first user may update the stored plurality of values by replacing the second value $X_2$ with a value $X'_2$, where $X'_2$ is a function of a private cryptographic value provided to the second user $f(B\_PrCV)$. According to a specific example, $B\_PrCV$ is denoted as $g^{x_B}$. After the update, the memory of the identification device 100 may comprise the plurality of values $(X_1, X'_2)$.

Upon receipt of the identification device 100, userB 120 may store the pair $(X_1, X'_2)$ in a database.

According to the example, in order to trace the identification device as it passes from one user to another, the TTP is able to build a graph of which users can send identification devices to other users.

While the example according to FIG. 3 may reduce the burden on the TTP, it may be difficult for the TTP 130 to trace the movement of the identification device 100 from one user to another, e.g. movement of the device through a supply chain. Furthermore, the following attacks are possible. Given the re-encryption key $k_{A,B} = x_A^{-1} x_B \mod p-1$, it is possible to efficiently compute $k_{B,A} = k_{A,B}^{-1} = x_B^{-1} x_A \mod p-1$. Moreover, given the re-encryption keys $k_{A,B}$ (as provided to userA) and $k_{B,C}$, where $k_{B,C}$ is provided by the TTP to userB in order to ship the identification device from userB to a third user, i.e. userC, it is possible to efficiently compute the re-encryption key $k_{A,C} = k_{A,B} k_{B,C}$. In order to counter these attacks, the TTP would have to include the reverse of each edge of the graph and compute the transitive closure of the graph.

Figure 4:
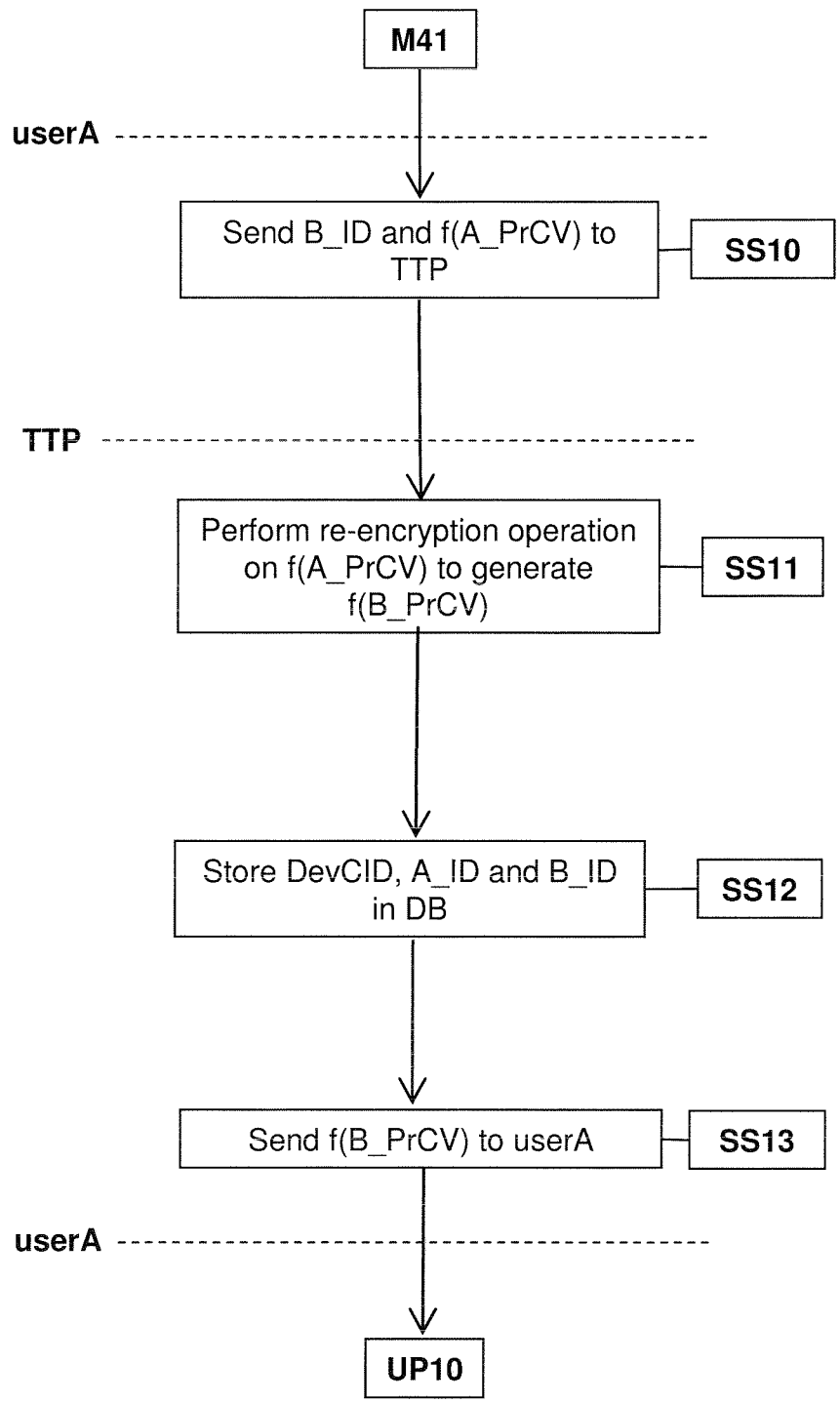
FIG. 4 shows another exemplary method of preparing an identification device to be shipped to another user. Steps M41 and UP10 refer to FIG. 3.

FIG. 4 shows an another exemplary method of preparing the identification device 100 in order to ship the device to another user. Step SS10 may be performed after the step M41 that is depicted in FIG. 3. After step SS13, the step UP10 which is depicted in FIG. 3 may be performed. Furthermore, the steps prefaced with "SS" (SS10, SS11, SS12, and SS13) may be understood as an alternative to steps S10, and S11 of FIG. 3.

To counter the attacks described above with respect to FIG. 3, it is possible to involve the TTP each time one user prepares to ship the identification device 100 to another user.

UserA 110 may prepare to send or ship the identication device 100, possibly attached to an item, to userB 120. At SS10, userA 110 may send an identifier of userB B_ID and a function of the private cryptographic value of userA $f(A\_PrCV)$ to the TTP 130. The identifier of userB B_ID may be a hash of userB's email address. According to a specific example, the function of the private cryptographic value of userA $f(A\_PrCV)$ may be $X_2 = (g^{x_A})^{t_{tag}^{-1}}$, where $g^{x_A}$ is the private cryptographic value of userA A_PrCV, and $t_{tag}^{-1}$ is the inverse of the random element computed when the identification device was initialized. $X_2$ may be understood to refer to the second value stored on the identification device 100. While it is possible that userA 110 intitialized the identification device 100, as in M41, userA 110 may also have read $X_2$ from the identification device 100 after having received the identification device 100 from another user.

According to the exemplary method, the TTP receives an identifier of userB B_ID and a function of a private cryptographic value of userA $f(A\_PrCV)$. At SS11, the TTP 130 may perform a re-encryption operation on the function of a private cryptographic value of userA $f(A\_PrCV)$ to generate a function of a private cryptographic value of userB $f(B\_PrCV)$. According to a specific example, the following calculation is performed to generate $f(B\_PrCV)$, such that $X'_2 = ((g^{x_A})^{t_{tag}^{-1}})^{x_A^{-1} x_B} = (g^{x_B})^{t_{tag}^{-1}}$. $X'_2$ denotes the new second value to be stored on the identification device 100, which, according to this example, is a function of a private cryptographic value of the second user $f(B\_PrCV)$. The exchange between userA 110 and the TTP 130 is visual depicted in Diagram 3.

Diagram 3: Ship Protocol with strong tracking

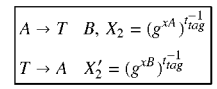

The TTP 130 may further compute $g^{t_{tag}^{-1}} = X_2^{x_A^{-1}}$. At SS12, the TTP may then store the triple $<g^{t_{tag}^{-1}}, A, B>$ in a database, where A corresponds to an identifier of userA A_ID and B corresponds to an identifier of userB B_ID. The value $g^{t_{tag}^{-1}}$ uniquely distinguishes a particular identification device from other identification devices and the value is not changed. At SS13, the TTP 130 may send $f(B\_PrCV)$, i.e. the value corresponding to $X'_2$, to userA 110. Once userA 110 has received $f(B\_PrCV)$, userA 110 may update the values stored on the identification device by replacing $f(A\_PrCV)$ with $f(B\_PrCV)$ at step UP10, as depicted in FIG. 3.

By being involved in each shipping transaction (where a shipping transaction consists of the steps SS10 to SS13 or S20 to S23) and recording a triple corresponding to the transaction, the TTP 130 can trace the path of any identification device 100 from user to user. This may have the advantage of allowing the TTP 130 to build a complete historical record of the path of every identification device. In other words, the TTP 130 can build a complete forwarding pedigree for each identification device. Thus, the TTP 130 can build an entire shipping graph for each identification device and corresponding item. No user outside the graph can successfully authenticate.

It may also be an advantage that the TTP 130 can then identify any user who divulged cryptographic values if an impostor (i.e. a user who requests information about an identification device he never possessed) is identified.

Furthermore, the involvement of the TTP 130 in each shipping transaction (where a shipping transaction consists of the steps SS10 to SS13 or S20 to S23) may have the following advantage. If an unauthorized party is successful in an illegitimate authentication, the unauthorized party can be traced. In addition, the TTP 130 could also trace which legitimate user leaked information that allowed the unauthorized party to authenticate. Therefore there is a strong incentive not to intentionally disclose the information on the identification device 100. According to one example, this may lead to tight control of a supply chain.

Figure 5:
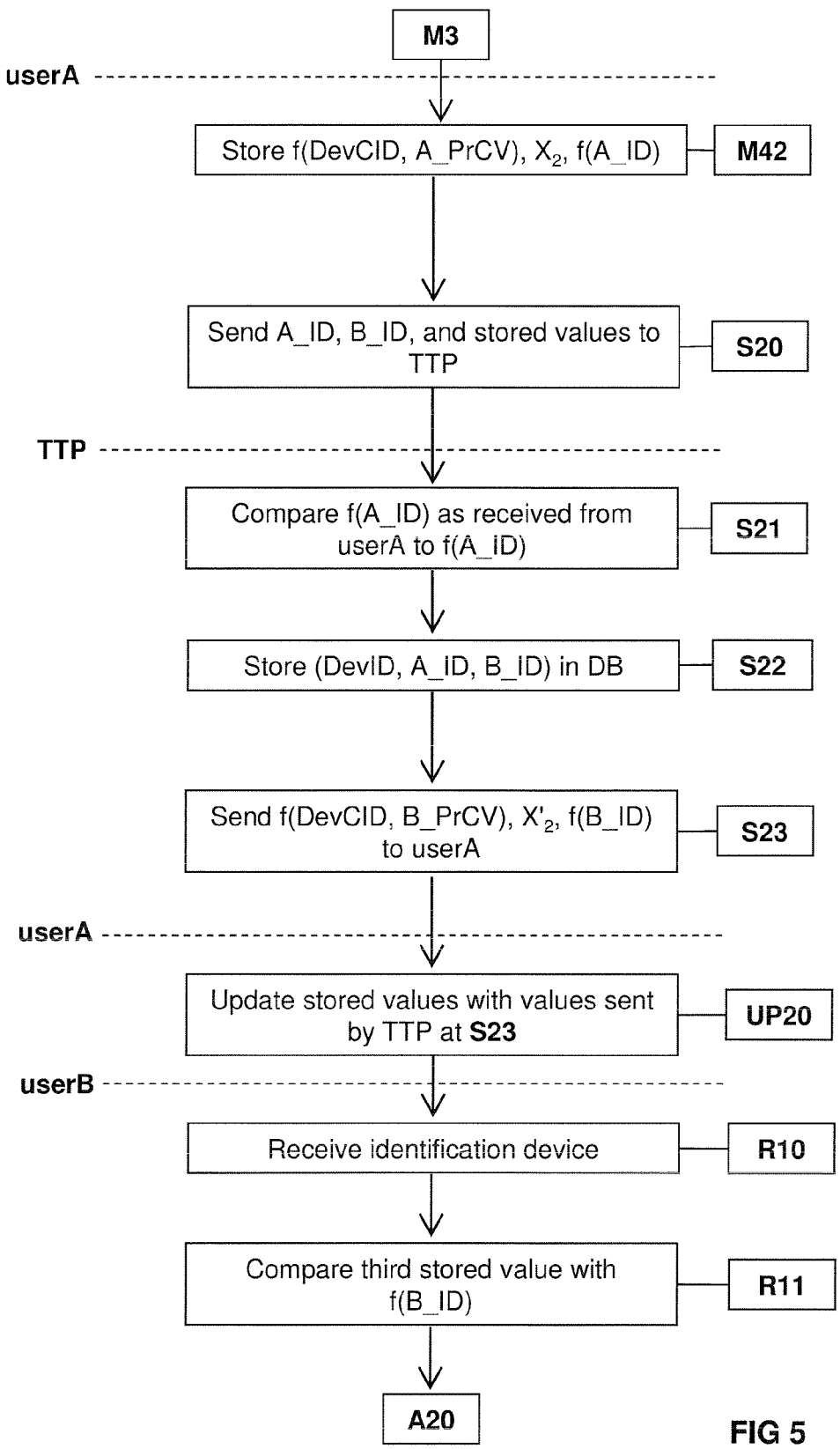
FIG. 5 shows yet another exemplary method of preparing an identification device to be shipped to another user. Step M42 represents a possible implementation of step M4. Step A20 refers to FIG. 6.

FIG. 5 shows an exemplary method of preparing the identification device 100 to be shipped from userA 110 to userB 120. The method of FIG. 5 may be understood as an alternative to the method described in FIGS. 3 and 4. Steps (S10, S11) from FIG. 3, steps (SS11, SS12, SS13) from FIG. 4, and steps (S20, S21, S22, S23) from FIG. 5 may be understood as sets of alternative steps that may be taken in order to prepare to ship an identification device from one user to another.

According to the exemplary method, the set of system parameters, while similar, may not entirely correspond to the parameters generated in the description corresponding to FIG. 3. Furthermore, in the following method, a user's public cryptographic information (i.e. the public cryptographic values assigned to the user) is the hash of the user's identity. For example, a user's public cryptographic information may be the cryptographic hash of the user's email address. Thus, there is no need for the use of certificates or interaction with a certificate authority in order to verify public cryptographic information. Moreover, the exemplary method may require the support of the TTP 130 each time a user prepares to ship the identification device 100. This allows every step of the path of the identification device 100 (i.e. the forwarding pedigree of the device) to be recorded. Thus, the method of this example shares the advantages described above with respect to FIG. 4.

For the purposes of the example, a cryptographic hash function, i.e. the hash function H, may be defined in the following way. Parameters of the hash function H are as follows:

$$g \xleftarrow{R} G_1,$$

where g is a random element of the group $G_1$;

$$u_0, u_1, \ldots, u_n \xleftarrow{R} Z_p^*,$$

where $u_0, u_1, \ldots, u_n$ are n+1 random elements of the group $Z_p^*$.

Thus, in order to define the hash function H,
assign $U_0 = g^{u_0}$, $U_1 = g^{u_1}$, ..., $U_n = g^{u_n}$;
define $v \in \{0,1\}^n$ as an n-bit string;
define $$h(v) = u_0 + \sum_{i \in V} u_i \in Z_p^*,$$

where $V \subseteq \{1, \ldots, n\}$ is the set of indexes i for which the i th bit of $\bar{v}$ is equal to 1.

Finally, the hash function H is defined such that $$H(v) = U_0 \prod_{i \in V} U_i = g^{h(v)} \in G_1.$$

Accordingly, it may be understood that for a user with identity A, $H(A) = g^h$, where $h \in Z_p^*$ and g is a random generator of $G_1$.

Continuing the example, at M1, the following system parameters may be computed by the TTP 130: (p, $G_1$, $G_2$, g, ê), where the parameters conform to the general definitions provided above. The TTP 130 may also compute $$u_0, u_1, \ldots, u_n \xleftarrow{R} Z_p^*$$

and assigns $U_0 = g^{u_0}$, $U_1 = g^{u_1}$, ..., $U_n = g^{u_n}$. Finally, the TTP 130 may compute $$\alpha \xleftarrow{R} Z_p^*$$

and sets $S = g^\alpha$ and $S' = g^{\alpha^{-1}}$. The system's public cryptographic values may be denoted by the set of values {p, $G_1$, $G_2$, g, S, S', ê, $U_0$, ..., $U_n$}. The values $u_0, u_1, \ldots, u_n$ and $\alpha$ are secret cryptographic values known only to the TTP 130.

The TTP 130 may then initialize an identity based cryptosystem. According to the example, the TTP 130 distributes the public parameters of the identity based cryptosystem to userA 110 and userB 120. The public parameters may include a master public key.

According to the example, at M2, userA 110 may register with the TTP 130. It may be the case that the user registers with the TTP 130 in order to enter a supply chain network. UserA 110 may authenticate with the TTP 130 using a conventional challenge-response protocol. UserA 110 may then choose a public key. The public key may be an arbitrary string, e.g. the email address of userA 110. UserA 110 may securely send the chosen public key to the TTP 130 and receive a private key corresponding to the public key from the TTP 130. In addition to the private key, userA may receive the private cryptographic value $I_A = H(A)^\alpha$. H (A) (also referred to as A_ID) may be understood as the crytpographic hash of an identifier of userA 100, e.g. the cryptographic hash of the email address of userA 100.

At M3, userB 120 may perform a similar registration process.

At M42, userA 110 may initialize the identification device 100. M42 may be understood to represent a particular implementation of step M4 from FIG. 1. M42 may also be understood as an alternative to step M41. UserA 110 may compute a random value $$t_{tag} \xleftarrow{R} Z_p^*$$

and a random value $$r \xleftarrow{R} Z_p^*.$$

UserA 110 may also compute $X_1 = S^{ttag}I_A^r$, $X_2 = g^r$ and $X_3 = H(A)^r$. After this calculation is performed, the random value $t_{tag}$ may be deleted or wiped for security reasons. UserA 110 may then store the plurality of values ($X_1$, $X_2$, $X_3$) on the identification device 100. Thus, the stored plurality of values includes a third value, i.e. $X_3 = H(A)^r$ according to the example, which is a function of the identity of the first user f(A_ID). $X_1$ may be understood as the first value stored on the identification device 100, $X_2$ may be understood as the second value stored on the identification device 100, and $X_3$ may be understood as the third value stored on the identification device 100. It should be understood that the order of the values is provided to aid understanding of the example and that the values may be stored on the identification device 100 in any order.

Of the values comprising $X_1$, $S^{ttag}$ may be understood as a cryptographic identifier of the identification device DevCID. $I_A^r$ may be understood as a function of the at least one private cryptographic value provided to the first user f(A_PrCV). Thus, the first value $X_1$ of the plurality of values stored on the identification device 100 may be understood as a function of the at least one private cryptographic value provided to the first user f(A_PrCV).

The initialization of the identification device 100 as performed by userA 110 at M42 does not require the assistance of the TTP 130.

It should be understood that step M42 may have been performed by another user prior to the performance of steps S20 to S23. In other words step M42 (and step M41) may be understood to correspond to initialization steps that only need to be performed once. However, steps S20 to S23 (as well as steps S10 and S11 and steps SS10 to SS13) may be performed at any time prior to shipping the identification device 100.

At S20, userA 110 may send the identifier of userA A_ID, the identifier of userB B_ID, and the plurality of values ($X_1$, $X_2$, $X_3$) to the TTP 130. Receipt of these values from userA 110 may indicate to the TTP 130 an intention of userA 110 to ship the identification device 100 to userB 120.

At S21, the TTP 130 may compare a function of the identifier of userA f(A_ID), as received from userA 110, to a function of the identifier of userA f(A_ID). According to a specific example, the comparison of S21 may be performed by using the following equation to check whether $\hat{e}(X_3, g) = \hat{e}(H(A), X_2)$, where $X_3 = H(A)^r$ and $X_2 = g^r$. On both sides of the equation A_ID is denoted as A. Furthermore, the left side binary map, i.e. $\hat{e}(X_3, g)$, may be understood as f(A_ID), as received from userA 110 by the TTP 130. The right side binary map, i.e. $\hat{e}(H(A), X_2)$, may be understood as f(A_ID). The comparison of S21 may be used to check if the stored plurality of values corresponds to the identifier of userA A_ID.

At S22, the TTP may compute $$S^{ttag} = \frac{X_1}{X_3^{\alpha}}$$

and store the triple ($S^{ttag}$, A, B) in a database. The value $S^{ttag}$ may be understood as the cryptographic identifier of the identification device DevCID. Triples stored in the database of the TTP 130 may be used to track the movement of the identification device 100.

The TTP 130 may then compute $$s \xleftarrow{R} Z_p^*,$$

and further compute $$\begin{cases} X_1' = \frac{X_1}{X_3^{\alpha}} I_B^s = S^{ttag} I_B^s \\ X_2' = g^s \\ X_3' = H(B)^s \end{cases}$$

At S23, the TTP 130 may send f(DevCID, B_PrCV), $X'_2$, f(B_ID) to userA 110. According to a particular example, f(DevCID, B_PrCV)=$X'_1$ and f(B_ID)=$X'_3$, where $S^{ttag}$ corresponds to DevCID, $I_B$ corresponds to B_PrCV, and B corresponds to B_ID. An example of the interaction between userA and the TTP (steps S20 and S23) is depicted in Diagram 4.

Diagram 4: Alternative Ship Protocol with strong tracking

| | |
|---|---|
| A → T | tag ID, A, B, $S^{ttag} I_A^r$ and $H(A)^r$ |
| T → A | $S^{ttag} I_B^r g^r$ and $H(B)^r$ |

While the value tagID (corresponding to DevID) is depicted in Diagram 4, it should be understood that this value is an optional part of the Alternative Ship Protocol. UserA 110 may then receive, from the TTP 130, a value which is a function of the identity of the second user f(B_ID). The value corresponds to the third value sent by the TTP 130, i.e. $X'_3$.

By being involved in each shipping transaction (where a shipping transaction consists of the steps SS10 to SS13 or S20 to S23) and recording a triple corresponding to the transaction, the TTP 130 can trace the path of any identification device 100 from user to user. This may have the advantage of allowing the TTP 130 to build a complete historical record of the path of every identification device. In other words, the TTP 130 can build a complete forwarding pedigree for each identification device. Thus, the TTP 130 can build an entire shipping graph for each identification device and corresponding item. It may be an advantage that no user outside the graph can successfully authenticate.

It may also be an advantage that the TTP 130 can then identify any user who divulged cryptographic values if an impostor (i.e. a user who requests information about an identification device he never possessed) is identified.

Furthermore, the involvement of the TTP 130 in each shipping transaction (where the shipping transaction consists of the steps SS10 to SS13 or S20 to S23) may have the following advantage. If an unauthorized party is successful in an illegitimate authentication, the unauthorized party can be traced. In addition, the TTP 130 could also trace which legitimate user leaked information that allowed the unauthorized party to authenticate. Therefore there is a strong incentive not to intentionally disclose the information on the identification device 100. According to one example, this may lead to tight control of a supply chain.

S20, S21, S22 and S23 may be performed in order to prepare to ship the identification device 100 from userA to userB 120.

At UP20, userA 110 may update the stored plurality of values by replacing the third value with the value which is a function of the identifier of the second user f(B_ID). According to a particular example, userA 110 may update the stored plurality of values ($X_1$, $X_2$, $X_3$) by replacing them with ($X'_1$, $X'_2$, $X'_3$), as computed above by the TTP 130 and sent to userA 110 in step S23. UP20 may be understood as an alternative to UP10, as shown in FIG. 3.

UserA 110 may then send or ship the identification device 100 to userB 120.

At R10, userB 120 may receive the identification device 100 identified by the identifier DevID. UserB may read the plurality of values stored on the identification device 100, and store the values in a database. UserB 120 may associate the plurality of values with the identifier of the identification device DevID.

At R11, userB 120 may compare the third value of the stored plurality of values with a function of the identity of the second user f(B_ID). According to a specific example, userB 120 may check whether $\hat{e}(X_3, g) = \hat{e}(H(B), X_2)$, where $X_2$ and $X_3$ refer to values stored during step UP20. The check performed by userB 120 may serve to verify that the received plurality of values was destined for userB 120. In order to ship the identification device 100 further, userB 120 may apply the ship protocol as described above (steps S20 to UP20).

The use of an identity based cryptosystem as described with respect to FIG. 5 may have the advantage of eliminating the need for public key distribution infrastructure. It may also be possible to embed information into a user identifier, e.g. an expiration date.

Figure 6:
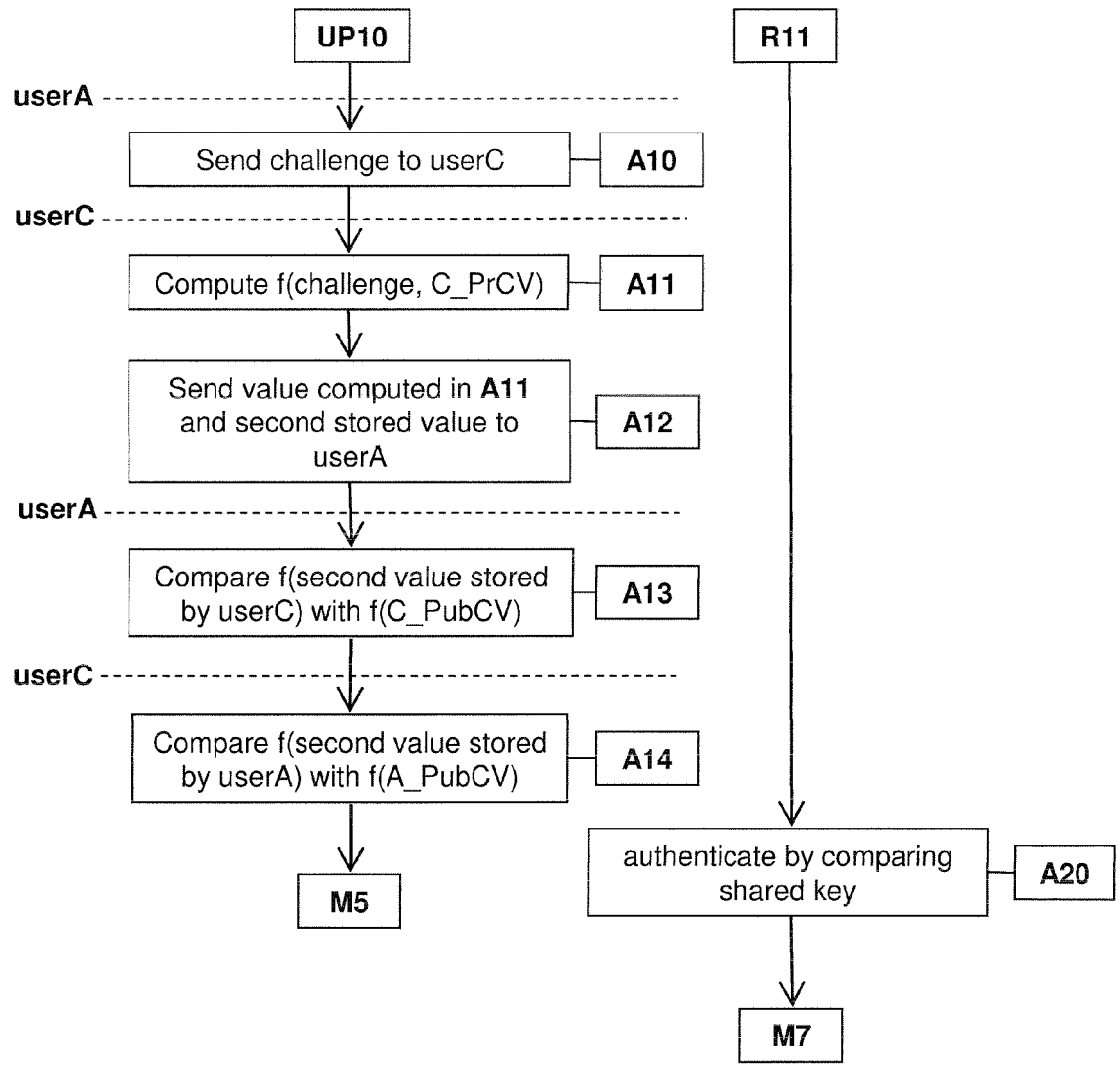
FIG. 6 shows two examples of mutual authentication. Steps M5 and M7 refer to FIG. 2. Steps UP10 and R11 refer to FIGS. 3 and 5, respectively.

FIG. 6 shows two alternative methods of mutual authentication. Authentication may be performed to verify that the first user 110 and the second user 120 have accessed the identification device 100 identified by the identifier DevID.

According to the first exemplary method, UP 10 and steps preceding UP 10 may be performed as described above with respect to FIGS. 3 and 4. In the following example, the second user 120 is referred to as userC. UserC may be the same user as userB; userC may also be a different user who has also accessed the identification device 100.

UserA 110 may retrieve the following values from a database ($X_{1A} = g^{t_{tag}}$, $X_{2A} = g^{x_A t_{tag}^{-1}}$). User C 120 may retrieve the following values from a database ($X_{1C} = g^{t_{tag}}$, $X_{2C} = g^{x_C t_{tag}^{-1}}$). The values may have been stored in the database by after initialization of the identification device 100, as described in connection with step M41, or upon receipt of the identification device 100, as explained with respect to userB 120 in the description of FIG. 3.

UserA 110 may contact the TTP 130 to obtain the public cryptographic values of userC C_PubCV. UserA 110 may send an identifier of userC C_ID to the TTP 130. The TTP 130 may respond with the public cryptographic values of userC C_PubCV. Data may be exchanged between userA 110 and the TTP 130 on a secure channel after authentication has been performed. The public cryptographic values of userC C_PubCV may be denoted as ($g^{z_C}$, $(g^{x_C} \tilde{g}^{y_C})^{\alpha^{-1}}$). A possible set of interactions between userA 110 and the TTP in order to obtain the public cryptographic values of userC 120 is depicted in Diagram 5. Diagram 5 may be also be described as a protocol governing the distribution of public cryptographic values by the TTP 130 to a user, e.g. userA 110 or userC 120.

Diagram 5: Public information protocol

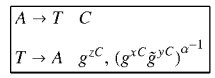

As an alternative to the interactions depicted in Diagram 5, the public cryptographic values of userC C_PubCV may be distributed as a certificate signed by the TTP 130. In other words, the public cryptographic values of userC C_PubCV may be encrypted with the private key of the TTP 130. The signed certificate could be distributed by any user. Thus, there may not be any need for userA 110 to interact with the TTP 130 in order to obtain the public cryptographic values of userC C_PubCV.

At A10, after obtaining the public cryptographic values of userC C_PubCV, userA 110 may compute a random element $$r \xleftarrow{R} \mathbb{Z}_p^*.$$

UserA 110 may then send $g^r$ as a random challenge to userC 120. In other words, the first user may send a random challenge to the second user.

At A11, userC 120 may compute a value which is a function of the random challenge and the at least one cryptographic value provided to userC f(challenge, C_PrCV). According to a specific example, the private cryptographic value of userC C_PrCV may be denoted as $y_C$. Thus, f(challenge, C_PrCV) may be denoted as $(g^r)^{y_C}$. UserC 120 may then retrieve $X_{2C}$ from his database. As noted above, $X_{2C}$ may be understood as the second value of a plurality of values stored on the identification device 100 by userC 120. $X_{2C}$ may have been stored on the identification device 100 during initialization of the identification device 100 or preparation to ship the identification device 100.

At A12, according to a specific example, userC 120 sends $(g^r)^{y_C}$ and $X_{2C}$ to userA 110. Thus, userA 110 receives a value which is a function of the random challenge and at least one private cryptographic value of userC 120. UserA 110 also receives $X_{2C}$.

At A13, userA 110 may compare a function of second value of the stored plurality of values with a function of the at least one public cryptographic value provided to userC C_PubCV. According to a specific example, userA 110 retrieves $X_{1A}$ from her database and checks whether $$\frac{\hat{e}(X_{1A}, X_{2C})^r \hat{e}(g^{y_C r}, \tilde{g})}{\hat{e}(S, (g^{x_C} \tilde{g}^{y_C})^{\alpha^{-1}})^r} = \frac{\hat{e}(g^{t_{tag}}, g^{t_{tag}^{-1} x_C})^r \hat{e}(g^{y_C r}, \tilde{g})}{\hat{e}(g^{\alpha}, (g^{x_C} \tilde{g}^{y_C})^{\alpha^{-1}})^r} = 1$$

holds. In the example above the second value of the stored plurality of values is denoted by $X_{2C}$. More specifically, $X_{2C}$ may be referred to as the second value of the plurality of values which was stored on the identification device 100 by userC 120. Furthermore, C_PubCV is denoted by $(g^{x_C} \tilde{g}^{y_C})^{\alpha^{-1}}$ in the exemplary equation above.

UserC 120 may query the TTP 130 for the public cryptographic values of userA A_PubCV. Alternatively, the public cryptographic values of userA A_PubCV may be distributed, e.g. by userA 110, as a certificate signed by the TTP 130. UserC 120 may then send a random challenge $g^s$ to userA 110 and receive $(g^{y_A s}, X_{2A})$ in response.

At A14, userC 120 may compare a function of second value of the stored plurality of values with a function of the at least one public cryptographic value provided to userC C_PubCV. According to a specific example, userC 120 retrives $X_{1C}$ from his database and checks whether $$\frac{\hat{e}(X_{1C}, X_{2A})^s \hat{e}(g^{y_A s}, \tilde{g})}{\hat{e}(S, (g^{x_A} \tilde{g}^{y_A})^{\alpha^{-1}})^s} = \frac{\hat{e}(g^{t_{tag}}, g^{t_{tag}^{-1} x_A})^s \hat{e}(g^{y_A s}, \tilde{g})}{\hat{e}(g^\alpha, (g^{x_A} \tilde{g}^{y_A})^{\alpha^{-1}})^s} = 1$$

holds. In the example above the second value of the stored plurality of values is denoted by $X_{2A}$. More specifically, $X_{2A}$ may be referred to as the second value of the plurality of values which was stored on the identification device 100 by userA 110. Furthermore, the at least one public cryptographic value provided to userA A_PubCV is denoted by $(g^{x_A} \tilde{g}^{y_A})^{\alpha^{-1}}$. The at least one public cryptographic value provided to userA A_PubCV may also be understood as at least one of the plurality of public cryptographic values provided to userA 110.

Continuing with the example, if the check holds for userA 110 and userC 120, both users can be certain that they have accessed the tag and may safely continue with the key agreement.

According to the comparison examples above, each comparison may be performed by providing compared values as inputs to an efficiently computable, non-degenerate, bilinear map for which the Computational Diffie-Hellman Problem cannot be computed efficiently. The bilinear maps are denoted with ê( ).

The following diagram describes the interactions between userA 110, userC 120 and the TTP in order to perform authentication in accordance with the example described above.

Diagram 6: First Authentication Protocol

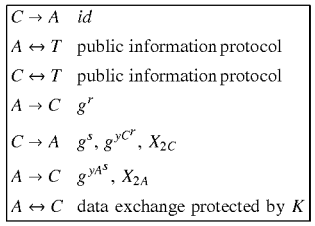

| | | |
|---|---|---|
| C → A | id | |
| A ↔ T | public information protocol | |
| C ↔ T | public information protocol | |
| A → C | $g^r$ | |
| C → A | $g^s, g^{y_{C^r}}, X_{2C}$ | |
| A → C | $g^{y_A s}, X_{2A}$ | |
| A ↔ C | data exchange protected by K | |

Upon successful mutual authentication, userA and userC may separately establish or derive a shared key. According to one specific example, userA 110 and userC 120 set the key K to $K = \hat{e}(g^{z_C}, g^s)^{z_A r}$
$= \hat{e}(g, g)^{r z_A s z_C}$
$= \hat{e}(g^{z_A}, g^r)^{z_C s}$ Subsequent communications between userA 110 and userC 120 may be protected through the use of the shared key K. It should be noted that no eavesdropper can reconstruct the key from information exchanged by userA 110 and userC 120, because no known probabilistic polynomial time algorithm can reconstruct $\hat{e}(g,g)^{rz_A s z_C}$ from $g^r$, $g^S$, $g^{z_A}$ and $g^{z_C}$.

The security of the method as described above can be shown using game based proofs.

For example, an attacker could try to create a tuple $(X_1, X_2)$ for another user without ever having obtained a re-encryption key for that user. This corresponds to actively leaking the stored plurality of values on the identification device 100 and eluding the TTP's traceability. The game Reencrypt may be understood to capture this attack. It is hard to win this game (i.e. a computer cannot efficiently solve the problems posed) without knowledge of cryptographic values known to the TTP 130.

Reencrypt Game

Consider an adversary A (also referred to as the attacker) that has as its goal to perform the ship protocol (as described with respect to FIG. 3) without the support of the TTP 130. A is allowed to freely perform all the algorithms of the protocol. Then A picks two users $I_o$ and $I_*$ of his choice; the simulator B Initializes a challenge identification device as $I_o$ and supplies all the relevant information about $I_o$ and $I_*$ to A, except the values $K_{I^*_o}$ and $K_{,I^*}$ and the private/secret cryptographic values related to $I_{I^*}$. Eventually, B submits to the attacker the pair $(X_{1I_o}, X_{2I_o})$ and A outputs his guess for the information $X_{2I_*}$. The game is called Reencrypt.

Theorem 1 If an adversary A has a non-null advantage

Reencrypt$_A$:=$Pr[A$ wins the game Reencrypt$]$ then a probabilistic, polynomial time algorithm B can create an environment where it uses A's advantage to solve a given instance of the modified Computational Diffie-Hellman Problem (mCDH).

Proof We define B as follows. B is given a random instance $(g, g^a, g^b, g^{b^{-1}})$ of the mCDH problem and wishes to use A to compute $g^{ab}$. The algorithm B simulates an environment in which A operates.

The simulator B picks and publishes the public parameters as described with respect to FIG. 3.

The attacker can Register at his will as any identity I he chooses. A can Initialize any identification device as a user of his choice. A can perform this operation autonomously without the involvement of the simulator. The Ship protocol is executed as described with respect to FIG. 3, therefore A is free to ask B to perform the ship protocol on any identification device A has received or on any identification device A has initialized. Then, the attacker can engage in authentication protocols with every user of his choice: in this case, B creates all the simulated parties I (except $I_*$) by selecting $x_1$, $y_1$, and $z_1$ thus knowing all the secret information. Finally, A can perform the receive protocol, declaring a target user I and thus receiving $(X_1 = g^{t_{tag}}, X_2 = g^{x_I t_{tag}^{-1}})$ from B, where $$t_{tag} \xleftarrow{R} Z_p^*.$$

The attacker A then chooses an identity $I_o$, for which B has already answered all his queries in the previous phase, and $I_*$ such that he does not know $K_{I^*_o}$ and $K_{,I^*}$ and the secret information $y_{I_*}$ and $z_{I_*}$. A asks for the public information about $I_*$; B answers with $g^{z_{I^*}}$, $(g^a \tilde{g}^{y_{I^*}})^{\alpha^{-1}}$. Finally, A can receive identification devices destined for $I_*$; to do so, B picks $$t_{tag} \xleftarrow{R} Z_p^*$$

and sends to A the pair $X_1 = g^{t_{tag}}$ and $X_2 = g^{t_{tag}^{-1} a}$. Eventually B sends A the information linked to the identification device of the challenge, crafted as follows: $X_{1I_o} = g^{b^{-1}}$ and $X_{2I_o} = (g^b)^{x_{I_o}}$ and A outputs its guess for $X_{2I_*}$.

If A has won the game, $X_{2I_*} = g^{ab}$ and B can give the same answer to the received instance of mCDH. This concludes the Reencrypt Game proof.

As the basis for a second game-based proof, an attacker could steal or otherwise obtain a tuple $(X_1, X_2)$ for another user and then try to authenticate as that user. This corresponds to getting ahold of an identification device and then trying to authenticate as its legitimate owner. The game Authenticate may be understood to capture this attack.

Authenticate Game

Consider an adversary A that has as its goal to perform the first authentication protocol as a user without owning the cryptographic values for the user, in particular the cryptographic values y and $z \in Z^*_p$, only known by the user. This game shows that a user is protected in case of theft of credentials on the identification device (the pair $(X_1, X_2)$) which may be possible using a rogue reader of an RFID tag. A is allowed to freely perform all the algorithms of the protocol (as user A). Then A picks a user $I_*$ of his choice; A receives as well any identification device destined for $I_*$. Eventually, A engages in the first authentication protocol, producing the values that should convince the simulator that he is $I_*$ and has possessed the item. We call this game Authenticate. Note that this game also rules out a user intentionally leaking credentials on the identification device to a third party.

Theorem 2 If an adversary A has a non-null advantage $$\text{Auth}_A := Pr\ [A\ \text{wins the game Authenticate}]$$

then a probabilistic, polynomial time algorithm B can create an environment where it uses A's advantage to solve a given instance of the Computational Diffie-Hellman Problem (CDH).

Proof We define B as follows. B is given a random instance $(g, g^a, g^b)$ of the CDH problem and wishes to use A to compute $g^{ab}$. The algorithm B simulates an environment in which A operates.

The simulator B picks $$g \xleftarrow{R} G_1, \beta \xleftarrow{R} Z^*_p$$

and sets $\tilde{g} \leftarrow g^\beta$ and publishes the public parameters as described with respect to FIG. 3.

The attacker can Register as any identity I he chooses. A can Initialize any identification device as any user of his choice. The Ship protocol is executed as described above with respect to FIG. 3, therefore A is free to ask B to perform the ship protocol on any identification device he has received or on any identification device he has initialized. Then, the attacker can engage in the first authentication protocol with every user of his choice: in this case, B creates all the simulated parties I (except $I_*$) by selecting $x_I$, $y_I$, and $z_I$ thus knowing all the secret information. Finally, A can perform the receive protocol as described with respect to FIG. 3, declaring a target user I and thus receiving $(X_1 = g^{t_{tag}}, X_2 = g^{x_I \cdot t_{tag}^{-1}})$ from B, where $$t_{tag} \xleftarrow{R} Z^*_p.$$

The attacker A then chooses the identity $I_*$ he wishes to authenticate as, amongst the identities not queried before. A receives $I_*$'s public information $g^{z_{I^*}}$ and $(g^{x_{I^*}} g^{\alpha\beta})^{\alpha^{-1}}$. A can receive identification device information destined to $I_*$: B picks $$t_{tag} \xleftarrow{R} Z^*_p$$

and sends A $(X_1 = g^{t_{tag}}, X_2 = g^{x_I \cdot t_{tag}^{-1}})$. To trigger the challenge, A sends B the identifier of one of the identification devices received as $I_*$. Now, B answers with a random challenge $g^b$. A must then answer—according to the protocol—with $(g^b)^{y_{I^*}}$ and $X_{2I_*}$.

If A has won the game, $(g^b)^{y_{I^*}} = g^{ab}$ and B can give the same answer to the received instance of CDH. This concludes the Authenticate Game proof.

According to the second exemplary method, R11 and steps preceding R11 may be performed as described above with respect to FIG. 5. In the following example, the second user 120 is again referred to as userB. UserB may be the same user as userC; userB may also be a different user who has also accessed the identification device 100.

UserB 120 may initiate an authentication process by sending an identifier of the identification device DevID to userB. According to one example, userA 110 and userB 120 both possess the values $(X_1, X_2, X_3)$. The triplet or stored plurality of values may have been read from the identification device 100 upon receipt at R10 or may have been stored after an initialization of the identification device 100 at M42. The following example continues the conventions observed above, wherein the subscript A identifies values corresponding to userA 110 and the subscript B identifies values corresponding to userB 120.

To continue the authentication process, userA 110 may choose a random nonce $n_A \in Z^*_p$. A nonce may be understood as a value used to assure a recipient that a message is not a replay of an old message that an attacker observed. UserA 110 may then compute $\text{IBE}_B$ $(H(B)^{n_A}, (S')^{n_A})$, and send the computed value to userB 120. $\text{IBE}_B(m)$ may be understood to indicate a message encrypted for userB 120, or a message encrypted with a public cryptographic value, e.g. the public key, of userB 120. In this case, m is $H(B)^{n_A}, (S')^{n_A}$. Other values may be understood as described with respect to FIG. 5.

Similarly userB 120 may choose a random $n_B \in Z^*_p$. UserB 120 may then compute $\text{IBE}_A(H(A)^{n_B}, (S')^{n_B})$ and send it back to userA 110. $\text{IBE}_A(m)$ may be understood to indicate a message encrypted for userA 110, or a message encrypted with a public cryptographic value, e.g. the public key, of userA 110.

At A20, if both userA 110 and userB 120 have accessed the same identification device 100, they can derive a common shared key. Thus, $$K = \left( \frac{\hat{e}(X_{1A}, (S')^{n_B})}{\hat{e}(H(A)^{n_B}, X_{2A})} \right)^{n_A}$$

$$= \left( \frac{\hat{e}(S^{t_{tag}} I^r_A, (S')^{n_B})}{\hat{e}(H(A)^{n_B}, g^r)} \right)^{n_A}$$

$$= \hat{e}(g, \tilde{g})^{t_{tag} n_A n_B}$$

$$= \left( \frac{\hat{e}(S^{t_{tag}} I^s_B, (S')^{n_A})}{\hat{e}(H(B)^{n_A}, g^s)} \right)^{n_B}$$

$$= \left( \frac{\hat{e}(X_{1B}, (S')^{n_A})}{\hat{e}(H(B)^{n_A}, X_{2B})} \right)^{n_B}$$

The shared key can be used to prove by each user to prove to the other user that they have legitimately accessed the identification device 100. In order to seal the handshake, i.e. to finish the authentication process, the users can use a conventional challenge-response protocol in order to prove mutual knowledge of the shared key without leaking it. Thus, comparing a first shared key with a second shared key may be understood as verifying that the shared keys are equal using a challenge-response protocol.

Communications between the first user 110 and the second user 120 can be protected using the key K. Understanding of the interaction between userA 110 and userB 120 may be enhanced through the following diagram.

Diagram 7: Second Authentication Protocol

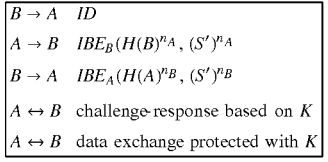

| | |
|---|---|
| $B \to A$ | ID |
| $A \to B$ | $IBE_B(H(B)^{n_A}, (S')^{n_A}$ |
| $B \to A$ | $IBE_A(H(A)^{n_B}, (S')^{n_B}$ |
| $A \leftrightarrow B$ | challenge-response based on $K$ |
| $A \leftrightarrow B$ | data exchange protected with $K$ |

An advantage of the second method described with respect to FIG. 6 may be that the use of identities rather than certificates (i.e. an identity based cryptosystem rather than a conventional public key cryptosystem) facilitates easier key management. An additional advantage of the second method may be that in comparison to the first method, the number of interactions between the users and the TTP 130 is reduced.

An advantage both the first and the second methods described with respect to FIG. 6 may be that, since challenges destined for a user are encrypted under the public key of his identity, eavesdropping on a challenge or reading the plurality of values stored on identification device 100 will not compromise the security of the method.

An additional advantage of both the first and the second authentication protocols may be that a user has a strong incentive not to disclose the private cryptographic values provided to the user. For example, if userA 110 discloses his private cryptographic values A_PrCV to an attacker, the attacker will be able to authenticate as userA 110.

The following game-based proof shows that, with all the cryptographic values in the hands of an adversary except the cryptographic values associated with a challenge identification device and a challenge user, the adversary is not able to impersonate the latter. This game is broad enough to include the following elements: privacy of the key exchange from an eavesdropper, collusion of several participants, and forgery of rogue identification device information.

Consider an adversary A that has as its goal to perform a successful authentication—thus convincing another user that he has legitimately accessed an identification device—without disposing of the legitimate information. In particular, A does not have the tuple $(X_{1v_*}, X_{2v_*}, X_{3v_*})$ for a given user $v_*$ and a given identification device, both object of the challenge.

Impersonate Game

A is allowed to freely perform all the algorithms of the protocol. Then, the simulator B Initializes a challenge tag, and yet the adversary is able to get the information to perform a successful authentication (according to the second authentication protocol) for that identification device as any user of his choice (except the one object of the challenge).

Finally, the attacker picks a challenge user $v_*$ and is required to run a successful authentication, convincing the simulator that he is user $v_*$ having owned the challenge tag. In particular, at the end of the game, the attacker is required to output the key K. We call this game Impersonate.

Theorem 3 If an Adversary A has a Non-null Advantage $$\text{Impersonate}_A := Pr[A \text{ wins the game Impersonate}]$$

then a probabilistic, polynomial time algorithm B can create an environment where it uses A's advantage to solve a given instance of the Bilinear Decisional Diffie-Hellman Problem (BDDH).

Proof We define B as follows. B is given a random instance $(g, g^a, g^b, g^c, g^x)$ of the BDDH problem and wishes to use A to check whether $x = abc$. The algorithm B simulates an environment in which A operates.

The simulator B sets an integer $m = 4q$ where q is an upper bound on the number of identities that the adversary will consider throughout his queries to the various protocols. B then chooses $$k \xleftarrow{R} \{0, n\}$$

and chooses two random vectors $$X = \{x_i\}_{i=1}^n \xleftarrow{R} \{0, m-1\}^n$$

and $$Y = \{y_1\}_{i=1}^n \xleftarrow{R} Z_p^*.$$

The following functions are defined:

$$F(v) = (p - mk) + x_0 + \sum_{i \in V} x_i, \quad J(v) = y_0 + \sum_{i \in V} y_i$$

and K(v) as $$K(v) = \begin{cases} 0, & \text{if } x_0 + \sum_{i \in V} x_i = 0 \bmod m; \\ 1, & \text{otherwise.} \end{cases}$$

The simulator sets g as the generator received from the decisional Bilinear Diffie-Hellman (BDH) challenge $U_0 = (g^b)^{p-km+x_0} g^{y_0}$ and $U_i = (g^b)^{x_i} g^{y_i}$; the simulator then picks $$\alpha \xleftarrow{R} Z_p^*,$$

sets $S = g^\alpha$ and $S' = g^{\alpha^{-1}}$ and publishes the public system parameters according to the rules of the protocol as defined with respect to FIG. 5. Notice that now, $$H(v) = U_0 \prod_{i \in V} U_i = g^{bF(v) + J(v)},$$

where V is the set of indexes i for which the i th bit of the string at hand equals 1.

First of all, the attacker receives all Identty Based Encryption (IBE) private keys: this way, the protection of IBE is disabled. Therefore, in the rest of this proof, the notation IBE (•) is omitted.

The attacker can Register at will as any identity $v_i$ he chooses, different from $v_*$, receiving from the TTP the value $I_{v_i}$.

A can Initialize any identification device as any user of his choice. A can perform this operation autonomously without the involvement of the simulator.

Upon execution of the Alternative Ship protocol, as defined with respect to FIG. 5, the attacker A sends to B the ID of an identification device, two identities $v_i$ and $v_j$ and the tuple $(X_1 = S^{ttag} I_{v_i}^r, X_2 = g^r, X_3 = H(v_i)^r)$. B computes $$\begin{cases} X_{1'} = \dfrac{X_1}{X_3^a} I_{v_j}^s = S^{ttag} I_{v_j}^s \\ X_{2'} = g^s \\ X_{3'} = H(v_j)^s \end{cases}$$

as mandated by the Alternative Ship protocol, and sends the tuple $(X_{1'}, X_{2'}, X_{3'})$ back to A.

Finally, A can perform the receive protocol, as defined with respect to FIG. 5 beginning with R10, by simply reading the stored plurality of values, storing them, and associating the values with the identifier of the identification device DevID.

B then Initializes a new identification device, which will be the object of the challenge. A is then entitled to receive—for any user $v_i$ of his choice—the information necessary to run a successful handshake or authentication as that user. A therefore sends $v_i$ to B. If $K(v_i) = 0$, B aborts and outputs a random guess. If not, B picks a $$r \xleftarrow{R} Z_p^*$$

and computes $$\begin{cases} X_1 = \left( (g^a)^{\frac{-J(v_i)}{F(v_i)}} \left( (g^b)^{F(v_i)} g^{J(v)} \right)^r \right)^\alpha \\ \quad = g^{\alpha ab} (g^{bF(v_i)+j(v_i)})^{a\tilde{r}} \\ \quad = S^{ab} I_{v_i}^{\tilde{r}} \\ X_2 = (g^a)^{\frac{-1}{F(v_i)}} g^r = g^{\tilde{r}} \end{cases}$$

where $\tilde{r} = r - \alpha/F(v_i)$. With the pair $(X_1, X_2)$, the attacker can perform any authentication he wants, but cannot perform the alternative ship protocol, as described with respect to FIG. 5.

In addition, given the pair $(X_1, X_2)$ for two identities $v_i$ and $v_j$, the attacker can check—through the execution of a second authentication protocol—whether the credentials received where indeed linked to the queried identities. Therefore, the simulation offered by B to A is perfect.

The attacker A then chooses an identity $v_*$ he has not queried before; if $$x_0 + \sum_{i \in V} x_i \neq km$$

the simulator aborts and submits a random guess. Otherwise we have $F(v_*) = 0 \bmod p$, which means that $H(V_*) = g^{J(v_*)}$. B then sends as challenge the pair $(H(v_*)^c = (g^c)^{J(v_*)}, S^{tc})$ according to the description of the second authentication protocol. A answers with $(H(v_i)^r, S^{tr})$, and then outputs the key K.

If A has won the game, $K = \hat{e}(g,g)^{abcr}$. Therefore, B can solve the BDDH problem by checking whether $\hat{e}(g^x, (S^{tr})^{\alpha^{-1}}) = K$ holds. This concludes the Impersonate Game proof.

The preceding description refers to the example of storing a plurality of values on the identification device (100) identified by the identifier. However, it should be understood that providing the plurality of values may comprise transmitting the values by means of a transmission medium such as guided (e.g. copper wire and fiber optics), wireless, or satellite medium.

The term corresponding in connection with a plurality of values "corresponding" to an identification device (100) identified by an identifier may be understood to indicate that the plurality of values includes a cryptographic identifier of the identification device (100) identified by the identifier.

The term corresponding in connection with a public or private cryptographic value "corresponding" to a user may be understood to indicate that the cryptographic value belongs to the user or has been assigned to the user (e.g. by the TTP 130).

Figure 7:
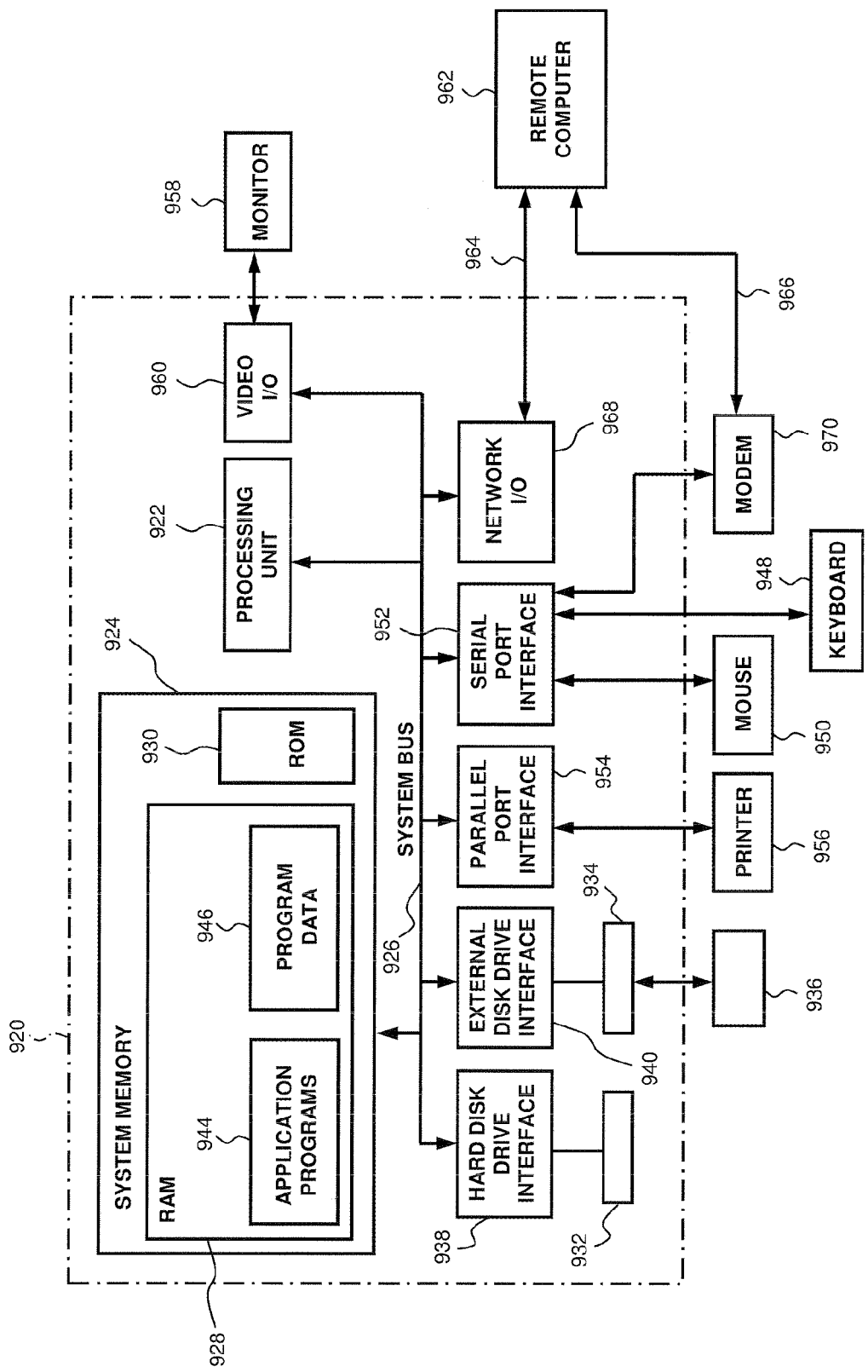
FIG. 7 shows a block diagram of an exemplary computer system.

FIG. 7 shows an exemplary system for implementing aspects and embodiments described above including a general purpose computing device in the form of a conventional computing environment 920 (e.g. a personal computer). The conventional computing environment includes a processing unit 922, a system memory 924, and a system bus 926. The system bus couples various system components including the system memory 924 to the processing unit 922. The processing unit 922 may perform arithmetic, logic and/or control operations by accessing the system memory 924. The system memory 924 may store information and/or instructions for use in combination with the processing unit 922. The system memory 924 may include volatile and non-volatile memory, such as a random access memory (RAM) 928 and a read only memory (ROM) 930. A basic input/output system (BIOS) containing the basic routines that helps to transfer information between elements within the personal computer 920, such as during start-up, may be stored in the ROM 930. The system bus 926 may be any of several types of bus structures including a memory bus or memory controller, a peripheral bus, and a local bus using any of a variety of bus architectures.

The personal computer 920 may further include a hard disk drive 932 for reading from and writing to a hard disk (not shown), and an external disk drive 934 for reading from or writing to a removable disk 936. The removable disk may be a magnetic disk for a magnetic disk driver or an optical disk such as a CD ROM for an optical disk drive. The hard disk drive 932 and the external disk drive 934 are connected to the system bus 926 by a hard disk drive interface 938 and an external disk drive interface 940, respectively. The drives and their associated computer-readable media provide non-volatile storage of computer readable instructions, data structures, program modules and other data for the personal computer 920. The data structures may include relevant data for the implementation of methods or systems for securing communications sent by a first user to a second user, as described above. The relevant data may be organized in a database, for example a relational or object database.

Although the exemplary environment described herein employs a hard disk (not shown) and an external disk 936, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 936, ROM 930 or RAM 928, including an operating system (not shown), one or more application programs 944, other program modules (not shown), and program data 946. The application programs may include at least a part of the functionality as depicted in FIGS. 1 to 6.

A user may enter commands and information, as discussed below, into the personal computer 920 through input devices such as keyboard 948 and mouse 950. Other input devices (not shown) may include a microphone (or other sensors), joystick, game pad, scanner, or the like. These and other input devices may be connected to the processing unit 922 through a serial port interface 952 that is coupled to the system bus 926, or may be collected by other interfaces, such as a parallel port interface 954, game port or a universal serial bus (USB). Further, information may be printed using printer 956. The printer 956, and other parallel input/output devices may be connected to the processing unit 922 through parallel port interface 954. A monitor 958 or other type of display device is also connected to the system bus 926 via an interface, such as a video input/output 960. In addition to the monitor, computing environment 920 may include other peripheral output devices (not shown), such as speakers or other audible output.

The computing environment 920 may communicate with other electronic devices such as a computer, telephone (wired or wireless), personal digital assistant, television, or the like. To communicate, the computer environment 920 may operate in a networked environment using connections to one or more electronic devices. FIG. 7 depicts the computer environment networked with remote computer 962. The remote computer 962 may be another computing environment such as a server, a router, a network PC, a peer device or other common network node, and may include many or all of the elements described above relative to the computing environment 920. The logical connections depicted in FIG. 7 include a local area network (LAN) 964 and a wide area network (WAN) 966. Such networking environments are commonplace in offices, enterprise-wide computer networks, intranets and the Internet and may particularly be encrypted.

When used in a LAN networking environment, the computing environment 920 may be connected to the LAN 964 through a network I/O 968. When used in a WAN networking environment, the computing environment 920 may include a modem 970 or other means for establishing communications over the WAN 966. The modem 970, which may be internal or external to computing environment 920, is connected to the system bus 926 via the serial port interface 952. In a networked environment, program modules depicted relative to the computing environment 920, or portions thereof, may be stored in a remote memory storage device resident on or accessible to remote computer 962. Furthermore other data relevant to securing communications sent by a first user to a second user (described above) may be resident on or accessible via the remote computer 962. It will be appreciated that the network connections shown are exemplary and other means of establishing a communications link between the electronic devices may be used.

The above-described computing system is only one example of the type of computing system that may be used to implement any of the methods for securing communications sent by a first user to a second user, as described above.

What is claimed is:

1. A computer-implemented method of securing communications sent by a first user to a second user, the method comprising:

receiving, by a first user from a trusted third party, at least one public cryptographic value corresponding to the first user and at least one private cryptographic value corresponding to the first user, wherein the at least one public cryptographic value of the first user and the at least one private cryptographic value of the first user include at least one value generated by the trusted third party;

storing, by the first user, a plurality of values on an identification device identified by an identifier, the plurality of values including a first value that is a function of a cryptographic identifier of the identification device and a second value that is a function of the at least one private cryptographic value of the first user;

deriving, by the first user, a shared key using the at least one private cryptographic value of the first user, and at least one of the plurality of values stored on the identification device identified by the identifier;

receiving, by the second user, the identification device;

deriving, by the second user, the shared key using a private cryptographic value of the second user and at least one of the plurality of values stored on the identification device; and protecting communications sent by the first user to the second user with the shared key.

2. The computer-implemented method of claim 1 wherein the method further comprises:

updating the stored plurality of values by replacing the second value of the stored plurality of values with a re-encrypted value.

3. The computer-implemented method of claim 2 further comprising:

receiving, by the first user from the trusted third party, a re-encryption key which is a function of a secret cryptographic value of the second user;

computing the re-encrypted value which is a function of a private cryptographic value of the second user using the re-encryption key; and storing the updated plurality of values on the identification device identified by the identifier.

4. The method of claim 3 wherein the secret cryptographic value of the second user is known only by the trusted third party.

5. The computer-implemented method of claim 2 wherein updating the stored plurality of values comprises:

sending, by the first user, the second value of the stored plurality of values to the trusted third party; and receiving, by the first user from the trusted third party, the re-encrypted value, where the trusted third party derives the re-encrypted value from the second value of the stored plurality of values.

6. The computer-implemented method of claim 1 further comprising performing mutual authentication to verify that the first user and the second user have accessed the identification device identified by the identifier.

7. The computer-implemented method of claim 6 wherein deriving the shared key by the first user comprises performing mutual authentication, and wherein performing mutual authentication comprises:

sending, by the first user to the second user, a random challenge; and receiving, by the first user from the second user, a value which is a function of the random challenge and at least one private cryptographic value of the second user.

8. The computer-implemented method of claim 6 further comprising comparing, by the first user, a function of the second value of the stored plurality of values with a function of at least one public cryptographic value of the second user.

9. The computer-implemented method of claim 6 wherein performing mutual authentication comprises using a challenge-response protocol to prove mutual knowledge of the shared key without disclosing the shared key.

10. The method of claim 1 wherein the deriving by the first user comprises deriving, by the first user, the shared key, using the public cryptographic value corresponding to the first user, the private cryptographic value corresponding to the first user, and at least one of the plurality of values stored on the identification device.

11. The method of claim 1 wherein the deriving by the first user comprises deriving, by the first user, a shared key, using a public cryptographic value corresponding to the second user, the private cryptographic value corresponding to the first user, and at least one of the plurality of values stored on the identification device.

12. A computer system for providing secure communications among a plurality of users, the system comprising:
- an identification device, wherein the identification device is identified by an identifier and the identification device comprises a memory;
- a first user computer associated with a first user and configured to store a plurality of values on the identification device identified by the identifier, the plurality of values including a first value that is a function of a cryptographic identifier of the identification device and a second value that is a function of at least one private cryptographic value of the first user;
- a second user computer associated with a second user; and
- a trusted third party computer configured to:
  - provide at least one public cryptographic value to the first user computer and the second user computer,
  - provide the at least one private cryptographic value of the first user to the first user computer, and
  - provide at least one private cryptographic value to the second user computer;
- wherein each of the at least one public cryptographic value provided to the first user computer, the at least one public cryptographic value provided to the second user computer, the at least one private cryptographic value provided to the first user computer, and the at least one private cryptographic value provided to the second user computer include at least one value generated by the trusted third party;
- wherein the first user computer is configured to derive a shared key from the at least one private cryptographic value provided to the first user computer and at least one of the plurality of values stored on the identification device identified by the identifier,
- wherein the second user computer is configured to receive the identification device, read the plurality of values from the identification device and derive the shared key from the at least one private cryptographic value provided to the second user computer and at least one of the plurality of values stored on the identification device; and
- wherein the first user computer and the second user computer are configured to protect communications between the first user computer and the second user computer based on the shared key.

13. The computer system of claim 12 wherein the identification device comprises a Radio Frequency Identification (RFID) tag.

14. A non-transitory recordable storage medium having recorded and stored thereon instructions that, when executed, cause a processing unit to perform:
- receiving, by a first user from a trusted third party, at least one public cryptographic value corresponding to the first user and at least one private cryptographic value corresponding to the first user, wherein the at least one public cryptographic value of the first user and the at least one private cryptographic value of the first user include at least one value generated by the trusted third party;
- storing, by the first user, a plurality of values on an identification device identified by an identifier, the plurality of values including a first value that is a function of a cryptographic identifier of the identification device and a second value that is a function of the at least one private cryptographic value of the first user;
- deriving, by the first user, a shared key using the at least one private cryptographic value of the first user, and at least one of the plurality of values stored on the identification device identified by the identifier;
- receiving, by a second user, the identification device;
- deriving, by the second user, the shared key using a private cryptographic value of the second user computer and at least one of the plurality of values stored on the identification device; and
- protecting communications sent by the first user to the second user with the shared key.

15. The non-transitory recordable storage medium of claim 14 further comprising instructions that, when executed, further cause the processing unit to perform:
- receiving, by the first user from the trusted third party, a re-encryption key which is a function of a secret cryptographic value of the second user;
- computing a re-encrypted value which is a function of a private cryptographic value of the second user using the re-encryption key;
- updating the stored plurality of values by replacing the second value of the stored plurality of values with the re-encrypted value; and
- storing the updated plurality of values on the identification device identified by the identifier.

16. A computer-implemented method of securing communications sent by a first user to a second user, the method comprising:
- receiving, by a first user from a trusted third party, at least one public cryptographic value corresponding to the first user and at least one private cryptographic value corresponding to the first user, wherein the at least one public cryptographic value of the first user and the at least one private cryptographic value of the first user include at least one value generated by the trusted third party;
- receiving an identification device that includes stored thereon a plurality of values that include a function of a cryptographic identifier of the identification device and a function of the at least one private cryptographic value of the first user;
- sending, by the first user to the trusted third party, an identifier of the first user and an identifier of the second user;
- receiving, by the first user from the trusted third party, a re-encryption key that is a function of a secret cryptographic value corresponding to the second user;
- storing, by the first user, one or more values on the identification device including the re-encryption key that is a function of a secret cryptographic value corresponding to the second user;
- deriving, by the first user, a shared key, using at least one of the plurality of values stored on the identification device;
- receiving, by the second user, the identification device;
- deriving, by the second user, the shared key, using at least one of the plurality of values stored on the identification device; and
- protecting communications sent between the first user and the second user based on the shared key.

17. The method of claim 16 wherein the identifier of the first user comprises a function of the private cryptographic value corresponding to the first user.

18. The method of claim 16 wherein the deriving by the first user comprises deriving, by the first user, a shared key using the public cryptographic value corresponding to the first user, the private cryptographic value corresponding to the first user and at least one of the plurality of values stored on the identification device.

19. The method of claim 16 wherein the deriving comprises deriving, by the first user, a shared key using a public cryptographic value corresponding to the second user, the private cryptographic value corresponding to the first user and at least one of the plurality of values stored on the identification device.

* * * * *